(12) United States Patent
Werner et al.

(10) Patent No.: US 11,688,408 B2
(45) Date of Patent: *Jun. 27, 2023

(54) PERCEPTUAL AUDIO CODING WITH ADAPTIVE NON-UNIFORM TIME/FREQUENCY TILING USING SUBBAND MERGING AND THE TIME DOMAIN ALIASING REDUCTION

(71) Applicant: Fraunhofer-Gesellschaft zur Förderung der angewandten Forschung e.V., Munich (DE)

(72) Inventors: Nils Werner, Erlangen (DE); Bernd Edler, Erlangen (DE); Sascha Disch, Erlangen (DE)

(73) Assignee: FRAUNHOFER-GESELLSCHAFT ZUR FÖRDERUNG DER ANGEWANDTEN FORSCHUNG E.V., Munich (DE)

( * ) Notice: Subject to any disclaimer, the term of this patent is extended or adjusted under 35 U.S.C. 154(b) by 0 days.

This patent is subject to a terminal disclaimer.

(21) Appl. No.: 17/301,813

(22) Filed: Apr. 15, 2021

(65) Prior Publication Data
US 2021/0233544 A1     Jul. 29, 2021

Related U.S. Application Data

(63) Continuation of application No. PCT/EP2019/078112, filed on Oct. 16, 2019.

(30) Foreign Application Priority Data

Oct. 26, 2018  (EP) ...................................... 18202927
Apr. 16, 2019  (EP) ...................................... 19169635

(51) Int. Cl.
G10L 15/00     (2013.01)
G10L 19/008    (2013.01)
(Continued)

(52) U.S. Cl.
CPC .......... G10L 19/008 (2013.01); G10L 19/022 (2013.01); G10L 19/0204 (2013.01); G10L 19/26 (2013.01)

(58) Field of Classification Search
CPC . G10L 19/008; G10L 19/0204; G10L 19/022; G10L 19/026; G10L 19/26; G10L 19/02; G06F 17/14
See application file for complete search history.

(56) References Cited

U.S. PATENT DOCUMENTS 7,548,853 B2 *  6/2009  Shmunk ................ G10L 19/022
                                                704/219
8,548,801 B2   10/2013  Kim et al.
(Continued)

FOREIGN PATENT DOCUMENTS

EP      3 276 620 A1    1/2018
JP      2007-526691 A   9/2007
(Continued)

OTHER PUBLICATIONS

V. Melkote and K. Rose, "Trellis-Based Approaches to Rate-Distortion Optimized Audio Encoding," in IEEE Transactions on Audio, Speech, and Language Processing, vol. 18, No. 2, pp. 330-341, Feb. 2010, doi: 10.1109/TASL.2009.2028373. (Year: 2010).*
(Continued)

*Primary Examiner* — Paras D Shah
*Assistant Examiner* — Uthej Kunamneni
(74) *Attorney, Agent, or Firm* — McClure, Qualey & Rodack, LLP

(57) ABSTRACT

Embodiments provide an audio processor for processing an audio signal to obtain a subband representation of the audio signal. The audio processor is configured to perform a cascaded lapped critically sampled transform on at least two partially overlapping blocks of samples of the audio signal,
(Continued)

to obtain a set of subband samples on the basis of a first block of samples of the audio signal, and to obtain a corresponding set of subband samples on the basis of a second block of samples of the audio signal. Further, the audio processor is configured to perform a weighted combination of two corresponding sets of subband samples, one obtained on the basis of the first block of samples of the audio signal and one obtained on the basis on the second block of samples of the audio signal, to obtain an aliasing reduced subband representation of the audio signal.

26 Claims, 19 Drawing Sheets

(51) Int. Cl.
*G10L 19/02* (2013.01)
*G10L 19/022* (2013.01)
*G10L 19/26* (2013.01)

(56) References Cited

U.S. PATENT DOCUMENTS

| | | | |
|---|---|---|---|
| 9,640,187 | B2 | 5/2017 | Niemisto et al. |
| 10,978,082 | B2* | 4/2021 | Werner et al. ........ G06F 17/147 |
| 2005/0185850 | A1 | 8/2005 | Vinton et al. |
| 2007/0063877 | A1 | 3/2007 | Shmunk et al. |
| 2009/0012797 | A1 | 1/2009 | Boehm et al. |
| 2015/0025897 | A1 | 1/2015 | Virette et al. |
| 2018/0131504 | A1* | 5/2018 | Pelissier ................. H03M 7/30 |
| 2019/0172471 | A1* | 6/2019 | Werner ................. G06F 17/147 |
| 2022/0165283 | A1* | 5/2022 | Werner ............... G10L 19/0204 |

FOREIGN PATENT DOCUMENTS

| | | |
|---|---|---|
| JP | 2008-547043 A | 12/2008 |
| JP | 2019-526074 A | 9/2019 |
| RU | 2 517 315 C2 | 5/2014 |
| WO | 2018/019909 A1 | 2/2018 |

OTHER PUBLICATIONS

N. Werner and B. Edler, "Nonuniform Orthogonal Filterbanks Based on MDCT Analysis/Synthesis and Time-Domain Aliasing Reduction," in IEEE Signal Processing Letters, vol. 24, No. 5, pp. 589-593, May 2017, doi: 10.1109/LSP.2017.2678023. (Year: 2017).*
Japanese language office action dated Jul. 12, 2022, issued in application No. JP 2021-522453.
English language translation of office action dated Jul. 12, 2022, issued in application No. JP 2021-522453 (pp. 1-9 of attachment).
Herre, J., et al.; "General Audio Coding;" The MPEG-4 Book; Chapter 11; 2002; pp. 487-519.
Johnston, J.D.; "Estimation of Perceptual Entropy Using Noise Masking Criteria;" ICASSP-88; International Conference on Acoustics, Speech, and Signal Processing; Apr. 1988; pp. 2524-2527.
Taswell, C.; "Empirical Tests for Evaluation of Multirate Filter Bank Parameters;" 2001; pp. 15-16.
Russian language office action dated Jan. 31, 2022, issued in application No. RU 2021114215.
English language translation of Russian office action dated Jan. 31, 2022.
International Search Report and Written Opinion dated Nov. 15, 2019, issued in application No. PCT/EP2019/078112.
ITU R-REC-BS.1770-3; "Algorithms to measure audio programme loudness and true-peak audio level;" 2012; pp. 1-24.
ITU-R BS.1534-3; "Method for the subjective assessment of intermediate quality level of audio systems;" Recommendation; Oct. 2015; pp. 1-36.
ITU R-REC-BS.1770-4; "Algorithms to measure audio programme loudness and true-peak audio level;" Oct. 2015; pp. 1-26.
ITU-R BS.1116-3; "Methods for the subjective assessment of small impairments in audio systems;" Recommendation; Feb. 2015; pp. 1-32.
Werner, N., et al.; "Nonuniform orthogonal filterbanks based on MDCT analysis/synthesis and time-domain aliasing reduction;" IEEE Signal Processing Letters; vol. 24; No. 5; May 2017; pp. 589-593.
Moore, B.C.J., et al.; "Suggested formulae for calculating auditory-filter bandwidths and excitation patterns;" J. Acoust. Soc. Am.; vol. 74; No. 3; Sep. 1983; pp. 750-753.
Taghipour, A., et al.; "A psychoacoustic model with partial spectral flatness measure for tonality estimation;" Proc. 22nd Eur. Signal Process.; Conf. (EUSIPCO); 2014; pp. 646-650.
Edler, B.; "Codierung von Audiosignalen mit überlappender Transformation und adaptiven Fensterfunktionen;" Frequenz; vol. 43; Sep. 1989; pp. 252-256.
Melkote, V., et al.; "Trellis-based approaches to rate-distortion optimized audio encoding;" IEEE Transactions on Audio, Speech, and Language Processing; vol. 18; No. 2; Feb. 2010; pp. 330-341.
Narasimhan, M., et al.; "Online decoding of markov models under latency constraints;" Proceedings of the 23rd International Conference on Machine Learning; 2006; pp. 657-664.
Schuh, F., et al.; "Efficient Multichannel Audio Transform Coding with Low Delay and Complexity;" Audio Engineerin Society; Sep. 2016; pp. 1-10.
Princen. J.P., et al.; "Subband/transform coding using filter bank designs based on time domain aliasing cancellation;" Acoustics, Speech, and Signal Processing; IEEE International Conference on ICASSP; Apr. 1987; vol. 12; pp. 2161-2164.
Necciari, T., et al.; "The erblet transform: An auditory-based time-frequency representation with perfect reconstruction;" Acoustics, Speech, and Signal Processing (ICASSP); 2013 IEEE, International Conference; May 2013; pp. 498-502.
Derrien, O., et al.; "A quasi-orthogonal, invertible, and perceptually relevant time-frequency transform for audio coding," European Signal Processing Conference (EUSIPCO); Aug. 2015; pp. 804-808.
Mau, J., et al.; "Timevarying orthogonal filter banks without transient filters;" Proceedings of the Acoustics, Speech, and Signal Processing; on International Conference; IEEE Computer Society; vol. 02; ICASSP '95; 1995; pp. 1328-1331.
Niamut, O.A., et al.; "Flexible frequency decompositions for cosine-modulated filter banks;" Acoustics, Speech, and Signal Processing; 2003 IEEE International Conference; vol. 5; Apr. 2003; pp V-449-52.
Niamut, O.A., et al.; "Subband merging in cosine-modulated filter banks;" Signal Processing Letters; IEEE; vol. 10; No. 4; Apr. 2003; pp. 111-114.
Valin, J.M., et al.; "High-quality, low-delay music coding in the opus codec;" AESC 135; Oct. 2013; pp. 1-10.
Bimbot, F., et al.; "Adaptive filter banks using fixed size MDCT and subband merging for audio coding-comparison with the MPEG AAC filter banks;" Audio Engineering Society; AESC121; Oct. 2006; pp. 1-9.
Korean language office action dated Apr. 5, 2023, issued in application No. KR 10-2021-7015408.
English language translation of office action dated Apr. 5, 2023 (pp. 1-6 of attachment).
Lecomte, J., et al.; "Efficient cross-fade windows for transitions between LPC-based and non-LPC based audio coding," Audio Engineering Society Convention 126; Audio Engineering Society; May 2009; pp. 1-9.

* cited by examiner

300

```
┌─────────────────────────────────────────────┐
│ Performing a cascaded lap critically sampled transform on at least │
│ two partially overlapping blocks of samples of the audio signal,   │
│ to obtain a set of subband samples on the basis of a first block of│ ─── 302
│ samples of the audio signal, and to obtain a corresponding set     │
│ of subband samples on the basis of a second block of samples       │
│ of the audio signal                                                │
└─────────────────────────────────────────────┘
                        │
                        ▼
┌─────────────────────────────────────────────┐
│ Performing a weighted combination of two corresponding sets of │
│ subband samples, one obtained on the basis of the first block  │
│ of samples of the audio signal and one obtained on the basis   │ ─── 304
│ on the second block of samples of the audio signal, to obtain an│
│ aliasing reduced subband representation of the audio signal.   │
└─────────────────────────────────────────────┘
```

```
┌─────────────────────────────────────────────┐
│ Performing a weighted [and shifted] combination of two          │
│ corresponding aliasing reduced subband representations of the   │ ─── 402
│ audio signal, to obtain an aliased subband representation, wherein│
│ the aliased subband representation is a set of subband samples  │
└─────────────────────────────────────────────┘
                        │
                        ▼
┌─────────────────────────────────────────────┐
│ Performing a cascaded inverse lap critically sampled transform  │
│ on the set of subband samples, to obtain a set of samples       │ ─── 404
│ associated with a block of samples of the audio signal.         │
└─────────────────────────────────────────────┘
```

Fig. 11

|  | q | avg. rate |
|---|---|---|
| transparent (HQ) | 1.0 | ~46 kbps |
| slightly impaired (MQ) | 2.75 | ~26 kbps |
| moderately impaired (LQ) | 4.0 | ~18 kbps |

Table 1.
Quality settings and their distortion parameter q and resulting average bitrate

Fig. 20

| ID | name |
|---|---|
| s01 | Castanets |
| s02 | Suzanne Vega - Tom's Diner |
| s03 | German Male Speaker |
| s04 | English Female Speaker |
| s05 | TODO - A Foggy Day |
| s06 | Tracy Chapman - Mountain O'Things |
| s07 | Ornette Coleman - In All Languages |
| s08 | Fools Garden - Lemon Tree |

Table 2.
Test items

Fig. 21

|    | W    | p    |     |
|----|------|------|-----|
| MQ | 0.90 | .000 | *** |
| LQ | 0.95 | .000 | *** |

Table 3.
Results of Shapiro-Wilk test for normality for the pairwise MUSHRA scores differences between the window switching filterbank (WS) and subband merging filterbank (SM) at slightly impaired (MQ) and moderately impaired (LQ) quality settings. W denotes W-statistic, p denotes p-value

|     |    | mean (SD)     | W       | p    |     |
| --- | -- | ------------- | ------- | ---- | --- |
| MQ  | WS | 71.16 (19.02) | 2070.50 | .000 | *** |
|     | SM | 78.02 (15.58) |         |      |     |
| LQ  | WS | 48.44 (22.67) | 2181.00 | .000 | *** |
|     | SM | 53.96 (20.95  |         |      |     |

Table 4.
Mean, standard deviation (SD), and Wilcoxon signed-rank test results for the MUSHRA scores comparing the window switching filterbank (WS) and subband merging filterbank (SM) at slightly impaired (MQ) and moderately impaired (LQ) quality settings. W denote sW-statistic, p denotes p-value

500

```
┌─────────────────────────────────────────────────┐
│ Performing a cascaded lap critically sampled    │
│ transform on at least two partially overlapping │
│ blocks of samples of the audio signal, to       │
│ obtain a set of subband samples on the basis    │──502
│ of a first block of samples of the audio        │
│ signal, and to obtain a corresponding set of    │
│ subband samples on the basis of a second        │
│ block of samples of the audio signal            │
└─────────────────────────────────────────────────┘
                        │
                        ▼
┌─────────────────────────────────────────────────┐
│ Performing a weighted combination of two        │
│ corresponding sets of subband samples, one      │
│ obtained on the basis of the first block of     │──504
│ samples of the audio signal and one obtained    │
│ on the basis on the second block of samples     │
│ of the audio signal, to obtain an aliasing      │
│ reduced subband representation of the audio     │
│ signal.                                         │
└─────────────────────────────────────────────────┘
```

```
┌─────────────────────────────────────────────────┐
│ Performing a weighted [and shifted] combination │
│ of two corresponding aliasing reduced subband   │
│ representations of the audio signal, to obtain  │──602
│ an aliased subband representation, wherein the  │
│ aliased subband representation is a set of      │
│ subband samples                                 │
└─────────────────────────────────────────────────┘
                        │
                        ▼
┌─────────────────────────────────────────────────┐
│ Performing a cascaded inverse lap critically    │
│ sampled transform on the set of subband         │──604
│ samples, to obtain a set of samples associated  │
│ with a block of samples of the audio signal.    │
└─────────────────────────────────────────────────┘
```

Fig. 27 ated Oct. 26, 2018, and from
PERCEPTUAL AUDIO CODING WITH ADAPTIVE NON-UNIFORM TIME/FREQUENCY TILING USING SUBBAND MERGING AND THE TIME DOMAIN ALIASING REDUCTION

CROSS-REFERENCE TO RELATED APPLICATIONS

This application is a continuation of copending International Application No. PCT/EP2019/078112, filed Oct. 16, 2019, which is incorporated herein by reference in its entirety, and additionally claims priority from European Application No. 18202927.2, filed Oct. 26, 2018, and from European Application No. 19169635.0, filed Apr. 16, 2019, which are also incorporated herein by reference in their entirety.

BACKGROUND OF THE INVENTION

Embodiments relate to an audio processor/method for processing an audio signal to obtain a subband representation of the audio signal. Further embodiments relate to an audio processor/method for processing a subband representation of an audio signal to obtain the audio signal. Some embodiments relate to perceptual audio coding with adaptive non-uniform time/frequency tiling using subband merging and time domain aliasing reduction. Some embodiments relate to a method for assisting in the control of the many parameters of a non-uniform filter bank, and extension of the filter bank to multichannel operation.

In perceptual coding, entropy and thus bitrate is commonly reduced by discarding redundant and perceptually irrelevant information. This is achieved using a filterbank and quantization. This filterbank, a quantizer and a psychoacoustic model are used together to shape the quantization noise so it is as close to the masking threshold as possible, as to maximize the coding efficiency and perceptual quality of the overall system [2].

During synthesis, quantization noise will be shaped in time and frequency by the spectral and temporal shape of the filterbank's impulse and frequency response. It follows that, to allow finegrained control of the quantization noise shape, it is desirable to use a filterbank with an impulse response compact in both time and frequency.

The most commonly used filterbank with these properties is the modified discrete cosine transform (MDCT), a filterbank which has a uniform time-frequency-resolution in all bands.

However, the human auditory system exhibits a nonuniform time/frequency resolution [3], resulting in different masking threshold shapes for different frequencies Therefore, it is the object of the present invention to provide a concept for operating a non-uniform filterbank that allows increasing the amount of quantization noise while maintaining audible artifacts low.

SUMMARY

According to an embodiment, an audio processor for processing an audio signal to obtain a subband representation of the audio signal may have: a cascaded lapped critically sampled transform stage configured to perform a cascaded lapped critically sampled transform on at least two partially overlapping blocks of samples of the audio signal, to obtain a set of subband samples on the basis of a first block of samples of the audio signal, and to obtain a corresponding set of subband samples on the basis of a second block of samples of the audio signal; and a time domain aliasing reduction stage configured to perform a weighted combination of two corresponding sets of subband samples, one obtained on the basis of the first block of samples of the audio signal and one obtained on the basis on the second block of samples of the audio signal, to obtain an aliasing reduced subband representation of the audio signal; wherein the cascaded lapped critically sampled transform stage is configured to segment a set of bins obtained on the basis of the first block of samples using at least two window functions, and to obtain at least two sets of bins based on the segmented set of bins corresponding to the first block of samples; wherein the cascaded lapped critically sampled transform stage is configured to segment a set of bins obtained on the basis of the second block of samples using the at least two window functions, and to obtain at least two sets of bins based on the segmented set of bins corresponding to the second block of samples; and wherein the sets of bins are processed using a second lapped critically sampled transform stage of the cascaded lapped critically sampled transform stage, wherein the second lapped critically sampled transform stage is configured to perform lapped critically sampled transforms having the same framelength for at least one set of bins; wherein the audio processor is configured to activate or maintain activated the time domain aliasing reduction stage, if the same framelengths are used for two subsequent blocks, and/or wherein the audio processor is configured to deactivate or maintain deactivated the time domain aliasing reduction stage, if different framelengths are used for two subsequent blocks.

According to another embodiment, an audio processor for processing an audio signal to obtain a subband representation of the audio signal, may have: a cascaded lapped critically sampled transform stage configured to perform a cascaded lapped critically sampled transform on at least two partially overlapping blocks of samples of the audio signal, to obtain a set of subband samples on the basis of a first block of samples of the audio signal, and to obtain a corresponding set of subband samples on the basis of a second block of samples of the audio signal; and a time domain aliasing reduction stage configured to perform a weighted combination of two corresponding sets of subband samples, one obtained on the basis of the first block of samples of the audio signal and one obtained on the basis on the second block of samples of the audio signal, to obtain an aliasing reduced subband representation of the audio signal; herein the cascaded lapped critically sampled transform stage is configured to segment a set of bins obtained on the basis of the first block of samples using at least two window functions, and to obtain at least two sets of bins based on the segmented set of bins corresponding to the first block of samples; wherein the cascaded lapped critically sampled transform stage is configured to segment a set of bins obtained on the basis of the second block of samples using the at least two window functions, and to obtain at least two sets of bins based on the segmented set of bins corresponding to the second block of samples; and wherein the sets of bins are processed using a second lapped critically sampled transform stage of the cascaded lapped critically sampled transform stage, wherein the second lapped critically sampled transform stage is configured to perform lapped critically sampled transforms having the same framelength for at least one set of bins; wherein the audio processor is configured to form a bitstream from an encoded aliasing reduced subband representation of the audio signal, wherein the audio processor is configured to provide the bitstream having at least one mergefactor, MF, parameter signaling at least one framelength of the corresponding sets of bins in the bitstream; wherein the audio processor is configured to provide the bitstream having only a subset of the mergefactor, MF, parameters signaling the framelength of the corresponding sets of bins in the bitstream.

According to still another embodiment, an audio processor for processing an audio signal to obtain a subband representation of the audio signal may have: a cascaded lapped critically sampled transform stage configured to perform a cascaded lapped critically sampled transform on at least two partially overlapping blocks of samples of the audio signal, to obtain a set of subband samples on the basis of a first block of samples of the audio signal, and to obtain a corresponding set of subband samples on the basis of a second block of samples of the audio signal; and a time domain aliasing reduction stage configured to perform a weighted combination of two corresponding sets of subband samples, one obtained on the basis of the first block of samples of the audio signal and one obtained on the basis on the second block of samples of the audio signal, to obtain an aliasing reduced subband representation of the audio signal; wherein the cascaded lapped critically sampled transform stage is configured to segment a set of bins obtained on the basis of the first block of samples using at least two window functions, and to obtain at least two sets of bins based on the segmented set of bins corresponding to the first block of samples; wherein the cascaded lapped critically sampled transform stage is configured to segment a set of bins obtained on the basis of the second block of samples using the at least two window functions, and to obtain at least two sets of bins based on the segmented set of bins corresponding to the second block of samples; and wherein the sets of bins are processed using a second lapped critically sampled transform stage of the cascaded lapped critically sampled transform stage, wherein the second lapped critically sampled transform stage is configured to perform lapped critically sampled transforms having the same framelength for at least one set of bins: wherein the audio processor is configured to form a bitstream from an encoded aliasing reduced subband representation of the audio signal, wherein the audio processor is configured to provide the bitstream having at least one mergefactor, MF, parameter signaling at least one framelength of the corresponding sets of bins in the bitstream; wherein the audio processor is configured to provide the bitstream having a time domain aliasing reduction, TDAR, parameter for each corresponding sets of bins.

According to another embodiment, an audio processor for processing an audio signal to obtain a subband representation of the audio signal may have: a cascaded lapped critically sampled transform stage configured to perform a cascaded lapped critically sampled transform on at least two partially overlapping blocks of samples of the audio signal, to obtain a set of subband samples on the basis of a first block of samples of the audio signal, and to obtain a corresponding set of subband samples on the basis of a second block of samples of the audio signal; and a time domain aliasing reduction stage configured to perform a weighted combination of two corresponding sets of subband samples, one obtained on the basis of the first block of samples of the audio signal and one obtained on the basis on the second block of samples of the audio signal, to obtain an aliasing reduced subband representation of the audio signal; wherein the cascaded lapped critically sampled transform stage is configured to segment a set of bins obtained on the basis of the first block of samples using at least two window functions, and to obtain at least two sets of bins based on the segmented set of bins corresponding to the first block of samples; wherein the cascaded lapped critically sampled transform stage is configured to segment a set of bins obtained on the basis of the second block of samples using the at least two window functions, and to obtain at least two sets of bins based on the segmented set of bins corresponding to the second block of samples; and wherein the sets of bins are processed using a second lapped critically sampled transform stage of the cascaded lapped critically sampled transform stage, wherein the second lapped critically sampled transform stage is configured to perform lapped critically sampled transforms having the same framelength for at least one set of bins; wherein the audio processor is configured to form a bitstream from an encoded aliasing reduced subband representation of the audio signal, wherein the audio processor is configured to provide the bitstream having at least one mergefactor, MF, parameter signaling at least one framelength of the corresponding sets of bins in the bitstream; wherein the audio processor is configured to provide the bitstream having the at least one mergefactor, MF, parameter such that a time domain aliasing reduction, TDAR, parameter is derivable from the at least one mergefactor, MF, parameter.

According to another embodiment, an audio processor for processing an audio signal to obtain a subband representation of the audio signal may have: a cascaded lapped critically sampled transform stage configured to perform a cascaded lapped critically sampled transform on at least two partially overlapping blocks of samples of the audio signal, to obtain a set of subband samples on the basis of a first block of samples of the audio signal, and to obtain a corresponding set of subband samples on the basis of a second block of samples of the audio signal; and a time domain aliasing reduction stage configured to perform a weighted combination of two corresponding sets of subband samples, one obtained on the basis of the first block of samples of the audio signal and one obtained on the basis on the second block of samples of the audio signal, to obtain an aliasing reduced subband representation of the audio signal; wherein the cascaded lapped critically sampled transform stage is configured to segment a set of bins obtained on the basis of the first block of samples using at least two window functions, and to obtain at least two sets of bins based on the segmented set of bins corresponding to the first block of samples; wherein the cascaded lapped critically sampled transform stage is configured to segment a set of bins obtained on the basis of the second block of samples using the at least two window functions, and to obtain at least two sets of bins based on the segmented set of bins corresponding to the second block of samples: and wherein the sets of bins are processed using a second lapped critically sampled transform stage of the cascaded lapped critically sampled transform stage, wherein the second lapped critically sampled transform stage is configured to perform lapped critically sampled transforms having the same framelength for at least one set of bins; wherein the audio processor is configured to perform a common/joint optimization for adapting the framelengths using a trellis-grid per set of subband samples.

According to still another embodiment, an audio encoder may have: an inventive audio processor as mentioned above; an encoder configured to encode the aliasing reduced subband representation of the audio signal, to obtain an encoded aliasing reduced subband representation of the audio signal; and a bitstream former configured to form a bitstream from the encoded aliasing reduced subband representation of the audio signal.

According to another embodiment, a method for processing an audio signal to obtain a subband representation of the audio signal may have the steps of: performing a cascaded lapped critically sampled transform on at least two partially overlapping blocks of samples of the audio signal, to obtain a set of subband samples on the basis of a first block of samples of the audio signal, and to obtain a corresponding set of subband samples on the basis of a second block of samples of the audio signal; and performing a weighted combination of two corresponding sets of subband samples, one obtained on the basis of the first block of samples of the audio signal and one obtained on the basis on the second block of samples of the audio signal, to obtain an aliasing reduced subband representation of the audio signal; wherein performing a cascaded lapped critically sampled transform has segmenting a set of bins obtained on the basis of the first block of samples using at least two window functions, and to obtain at least two sets of bins based on the segmented set of bins corresponding to the first block of samples; wherein performing a cascaded lapped critically sampled transform has segmenting a set of bins obtained on the basis of the second block of samples using the at least two window functions, and to obtain at least two sets of bins based on the segmented set of bins corresponding to the second block of samples; and wherein the sets of bins are processed using a second lapped critically sampled transform of the cascaded lapped critically sampled transform, wherein the second lapped critically sampled transform has performing lapped critically sampled transforms having the same framelength for at least one set of bins; wherein the weighted combination of the two corresponding sets of subband samples is performed, if the same framelengths are used for two subsequent blocks, and/or the weighted combination of the two corresponding sets of subband samples is not performed, if different framelengths are used for two subsequent blocks.

According to another embodiment, a method for processing an audio signal to obtain a subband representation of the audio signal may have the steps of: performing a cascaded lapped critically sampled transform on at least two partially overlapping blocks of samples of the audio signal, to obtain a set of subband samples on the basis of a first block of samples of the audio signal, and to obtain a corresponding set of subband samples on the basis of a second block of samples of the audio signal; and performing a weighted combination of two corresponding sets of subband samples, one obtained on the basis of the first block of samples of the audio signal and one obtained on the basis on the second block of samples of the audio signal, to obtain an aliasing reduced subband representation of the audio signal; wherein performing a cascaded lapped critically sampled transform has segmenting a set of bins obtained on the basis of the first block of samples using at least two window functions, and to obtain at least two sets of bins based on the segmented set of bins corresponding to the first block of samples; wherein performing a cascaded lapped critically sampled transform has segmenting a set of bins obtained on the basis of the second block of samples using the at least two window functions, and to obtain at least two sets of bins based on the segmented set of bins corresponding to the second block of samples; and wherein the sets of bins are processed using a second lapped critically sampled transform of the cascaded lapped critically sampled transform, wherein the second lapped critically sampled transform has performing lapped critically sampled transforms having the same framelength for at least one set of bins; forming a bitstream from an encoded aliasing reduced subband representation of the audio signal, providing the bitstream having at least one mergefactor, MF, parameter signaling at least one framelength of the corresponding sets of bins in the bitstream; wherein providing the bitstream has providing the bitstream having only a subset of the mergefactor, MF, parameters signaling the framelength of the corresponding sets of bins in the bitstream.

According to still another embodiment, a method for processing an audio signal to obtain a subband representation of the audio signal may have the steps of: performing a cascaded lapped critically sampled transform on at least two partially overlapping blocks of samples of the audio signal, to obtain a set of subband samples on the basis of a first block of samples of the audio signal, and to obtain a corresponding set of subband samples on the basis of a second block of samples of the audio signal; and performing a weighted combination of two corresponding sets of subband samples, one obtained on the basis of the first block of samples of the audio signal and one obtained on the basis on the second block of samples of the audio signal, to obtain an aliasing reduced subband representation of the audio signal; wherein performing a cascaded lapped critically sampled transform has segmenting a set of bins obtained on the basis of the first block of samples using at least two window functions, and to obtain at least two sets of bins based on the segmented set of bins corresponding to the first block of samples; wherein performing a cascaded lapped critically sampled transform has segmenting a set of bins obtained on the basis of the second block of samples using the at least two window functions, and to obtain at least two sets of bins based on the segmented set of bins corresponding to the second block of samples; and wherein the sets of bins are processed using a second lapped critically sampled transform of the cascaded lapped critically sampled transform, wherein the second lapped critically sampled transform has performing lapped critically sampled transforms having the same framelength for at least one set of bins; forming a bitstream from an encoded aliasing reduced subband representation of the audio signal, providing the bitstream having at least one mergefactor, MF, parameter signaling at least one framelength of the corresponding sets of bins in the bitstream; wherein providing the bitstream has providing the bitstream having a time domain aliasing reduction, TDAR, parameter for each corresponding sets of bins.

According to still another embodiment, a method for processing an audio signal to obtain a subband representation of the audio signal may have the steps of: performing a cascaded lapped critically sampled transform on at least two partially overlapping blocks of samples of the audio signal, to obtain a set of subband samples on the basis of a first block of samples of the audio signal, and to obtain a corresponding set of subband samples on the basis of a second block of samples of the audio signal; and performing a weighted combination of two corresponding sets of subband samples, one obtained on the basis of the first block of samples of the audio signal and one obtained on the basis on the second block of samples of the audio signal, to obtain an aliasing reduced subband representation of the audio signal; wherein performing a cascaded lapped critically sampled transform has segmenting a set of bins obtained on the basis of the first block of samples using at least two window functions, and to obtain at least two sets of bins based on the segmented set of bins corresponding to the first block of samples; wherein performing a cascaded lapped critically sampled transform has segmenting a set of bins obtained on the basis of the second block of samples using the at least two window functions, and to obtain at least two sets of bins based on the segmented set of bins corresponding to the second block of samples; and wherein the sets of bins are processed using a second lapped critically sampled transform of the cascaded lapped critically sampled transform, wherein the second lapped critically sampled transform has performing lapped critically sampled transforms having the same framelength for at least one set of bins; forming a bitstream from an encoded aliasing reduced subband representation of the audio signal, providing the bitstream having at least one mergefactor, MF, parameter signaling at least one framelength of the corresponding sets of bins in the bitstream; wherein providing the bitstream has providing the bitstream having the at least one mergefactor, MF, parameter such that a time domain aliasing reduction, TDAR, parameter is derivable from the at least one mergefactor, MF, parameter.

According to another embodiment, a method for processing an audio signal to obtain a subband representation of the audio signal may have the steps of: performing a cascaded lapped critically sampled transform on at least two partially overlapping blocks of samples of the audio signal, to obtain a set of subband samples on the basis of a first block of samples of the audio signal, and to obtain a corresponding set of subband samples on the basis of a second block of samples of the audio signal; and performing a weighted combination of two corresponding sets of subband samples, one obtained on the basis of the first block of samples of the audio signal and one obtained on the basis on the second block of samples of the audio signal, to obtain an aliasing reduced subband representation of the audio signal; wherein performing a cascaded lapped critically sampled transform has segmenting a set of bins obtained on the basis of the first block of samples using at least two window functions, and to obtain at least two sets of bins based on the segmented set of bins corresponding to the first block of samples; wherein performing a cascaded lapped critically sampled transform has segmenting a set of bins obtained on the of samples using the at least two window functions, and to obtain at least two sets of bins based on the segmented set of bins corresponding to the second block of samples; and wherein the sets of bins are processed using a second lapped critically sampled transform of the cascaded lapped critically sampled transform, wherein the second lapped critically sampled transform has performing lapped critically sampled transforms having the same framelength for at least one set of bins; performing a common/joint optimization for adapting the framelengths using a trellis-grid per set of subband samples.

Another embodiment may have a non-transitory digital storage medium having stored thereon a computer program for performing a method for processing an audio signal to obtain a subband representation of the audio signal, the method having the steps of: performing a cascaded lapped critically sampled transform on at least two partially overlapping blocks of samples of the audio signal, to obtain a set of subband samples on the basis of a first block of samples of the audio signal, and to obtain a corresponding set of subband samples on the basis of a second block of samples of the audio signal; and performing a weighted combination of two corresponding sets of subband samples, one obtained on the basis of the first block of samples of the audio signal and one obtained on the basis on the second block of samples of the audio signal, to obtain an aliasing reduced subband representation of the audio signal; wherein performing a cascaded lapped critically sampled transform has segmenting a set of bins obtained on the basis of the first block of samples using at least two window functions, and to obtain at least two sets of bins based on the segmented set of bins corresponding to the first block of samples; wherein performing a cascaded lapped critically sampled transform has segmenting a set of bins obtained on the basis of the second block of samples using the at least two window functions, and to obtain at least two sets of bins based on the segmented set of bins corresponding to the second block of samples; and wherein the sets of bins are processed using a second lapped critically sampled transform of the cascaded lapped critically sampled transform, wherein the second lapped critically sampled transform has performing lapped critically sampled transforms having the same framelength for at least one set of bins; wherein the weighted combination of the two corresponding sets of subband samples is performed, if the same framelengths are used for two subsequent blocks, and/or the weighted combination of the two corresponding sets of subband samples is not performed, if different framelengths are used for two subsequent blocks, when said computer program is run by a computer.

Embodiments provide an audio processor for processing an audio signal to obtain a subband representation of the audio signal. The audio processor comprises a cascaded lapped critically sampled transform stage configured to perform a cascaded lapped critically sampled transform on at least two partially overlapping blocks of samples of the audio signal, to obtain a set of subband samples on the basis of a first block of samples of the audio signal, and to obtain a corresponding set of subband samples on the basis of a second block of samples of the audio signal. Further, the audio processor comprises a time domain aliasing reduction stage configured to perform a weighted combination of two corresponding sets of subband samples, one obtained on the basis of the first block of samples of the audio signal and one obtained on the basis on the second block of samples of the audio signal, to obtain an aliasing reduced subband representation of the audio signal. Thereby, the cascaded lapped critically sampled transform stage is configured to segment a set of bins obtained on the basis of the first block of samples using at least two window functions, and to obtain at least two segmented sets of bins based on the segmented set of bins corresponding to the first block of samples, wherein the cascaded lapped critically sampled transform stage s configured to segment a set of bins obtained on the basis of the second block of samples using the at least two window functions, and to obtain at least two sets of bins [e.g., at least two mergefactor bands] [e.g., of 128 coefficients each] based on the segmented set of bins corresponding to the second block of samples, and wherein the sets of bins are processed [e.g., merged] using a second lapped critically sampled transform stage of the cascaded lapped critically sampled transform stage, wherein the second lapped critically sampled transform stage is configured to perform lapped critically sampled transforms having the same framelength [e.g., mergefactor] for at least one [e.g., each] set of bins.

In embodiments, the second lapped critically transform stage is configured to perform $N_{1,2}$ lapped critically sampled transforms on $N_{1,1}$ sub-sets of a first set [e.g., of 128 coefficients] of the at least two sets of bins obtained on the basis of the segmented set of bins corresponding to the first block of samples, wherein the $N_{1,1}$ lapped critically sampled transforms comprise the same framelength [e.g., mergefactor], wherein $N_{1,1}$ is a natural number greater than or equal to two.

In embodiments, the second lapped critically transform stage is configured to perform $N_{1,2}$ lapped critically sampled transforms on $N_{1,2}$ sub-sets [e.g., of equal length] of a corresponding first set [e.g., of 128 coefficients] of the at least two sets of bins obtained on the basis of the segmented set of bins corresponding to the second block of samples, wherein the $N_{2,1}$ lapped critically sampled transforms comprise the same framelength [e.g., mergefactor], wherein $N_{2,1}$ is a natural number greater than or equal to two.

In embodiments, the audio processor is configured to individually select the framelength [e.g., mergefactor] for each set of bins or for each of the corresponding sets of bins.

For example, the processor can select for each set the mergefactor, thereby achieving, for example, an improved or even highest possible coding efficiency.

In embodiments, the audio processor is configured to individually select the framelength [e.g., merge factor] for each block of samples.

For example, the processor can select for each block the mergefactor, thereby achieving, for example, an improved or even highest possible coding efficiency.

In embodiments, the audio processor is configured to activate or maintain activated the time domain aliasing reduction stage, if the same framelengths [e.g., mergefactors] are used for two subsequent blocks, and/or wherein the audio processor is configured to deactivate or maintain deactivated the time domain aliasing reduction stage, if different framelengths are used for two subsequent blocks.

For example, due to the TDAR, there are dependencies between the blocks. If the mergefactor is maintained, then TDAR is possible. If the mergefactor of two subsequent blocks is different, then TDAR is deactivated. Therefore (optionally), the processor can be configured to perform a common/joint optimization for adapting the mergefactors, e.g., a trellis-grid per set of subband samples [mergefactor band].

In embodiments, the processor is configured to perform a common/joint optimization for adapting the mergefactors [e.g., a trellis-grid per set of subband samples [mergefactor band]].

In embodiments, the at least two window functions comprise the same window width [e.g., to divide the spectrum in at least two [e.g., 8] mergefactor-bands of same size [e.g., of 128 coefficients each]].

In embodiments, the at least two window functions comprise different window width [e.g., to divide the spectrum in at least two mergefactor-bands of different size].

In embodiments, the at least two window functions comprise substantially rectangular windows.

In embodiments, the sets of bins obtained based on the at least two window functions are processed [e.g., merged] using the second lapped critically sampled transform stage, wherein the second lapped critically sampled transform stage is configured to perform at least two lapped critically sampled transforms having the same framelength [e.g., mergefactor] for at least one [e.g., each] of the sets of bins obtained based on the at least two window functions.

In embodiments, the audio processor is configured to perform joint channel coding.

In embodiments, the audio processor is configured to perform MIS or MCT as joint channel processing.

In embodiments, the audio processor is configured to activate or deactivate joint channel processing individually for each of the at least two segmented sets of bins [e.g., to individually activate or deactivate joint channel processing for each mergefactor-band; e.g. between the first lapped critically sampled transform stage and the second lapped critically sampled transform stage of the cascaded lapped critically sampled transform stage].

In embodiments, the audio processor is configured to form a bitstream from the encoded aliasing reduced subband representation of the audio signal, wherein the audio processor is configured to provide the bitstream comprising at least one MF parameter signaling at least one framelength [e.g., mergefactor] of the corresponding sets of bins in the bitstream.

In embodiments, the audio processor is configured to entropy encode the at least one MF parameter.

In embodiments, the audio processor is configured to provide the bitstream comprising only a subset of the MF parameters signaling the framelength [e.g., mergefactor] of the corresponding sets of bins in the bitstream.

In embodiments, the audio processor is configured to provide the bitstream comprising a TDAR parameter for each corresponding sets of bins.

In embodiments, the audio processor is configured to perform joint entropy coding of the MF and TDAR parameters.

In embodiments, the audio processor is configured to provide the bitstream comprising the at least one MF parameter such that a TDAR parameter is derivable from the at least one MF parameter [e.g., at a receiver or decoder site].

For example, instead of including the TDAR parameter in the bitstream provided by the audio processor, said TDAR parameter is derivable from the at least one MF parameter. For instance, equal MF parameters in two subsequent frames may indicate that TDAR is active, wherein different MF parameters in tow subsequent frames may indicated that TDAR is inactive.

In embodiments, the audio processor is configured to use a trellis-grid per set of subband samples [mergefactor band].

Further embodiments provide an audio encoder, wherein the audio encoder comprises an audio processor according to one of the above described embodiments, wherein the audio encoder comprises an encoder configured to encode the aliasing reduced subband representation of the audio signal, to obtain an encoded aliasing reduced subband representation of the audio signal, and wherein the audio encoder comprises a bitstream former configured to form a bitstream from the encoded aliasing reduced subband representation of the audio signal.

Further embodiments provide an audio processor for processing a subband representation of an audio signal to obtain the audio signal. The audio processor comprises an inverse time domain aliasing reduction stage configured to perform a weighted combination of two corresponding aliasing reduced subband representations of the audio signal, to obtain an aliased subband representation, wherein the aliased subband representation is a set of subband samples. Further, the audio processor comprises a cascaded inverse lapped critically sampled transform stage configured to perform a cascaded inverse lapped critically sampled transform on the set of subband samples, to obtain a set of samples associated with a block of samples of the audio signal. Thereby, the cascaded inverse lapped critically sampled transform stage comprises a first inverse lapped critically sampled transform stage configured to perform an inverse lapped critically sampled transform on the set of subband samples, to obtain a set of bins associated with a given subband of the audio signal, wherein the first inverse lapped critically sampled transform stage is configured to perform inverse lapped critically sampled transforms having the same framelength [e.g., mergefactor] for the set of subband samples.

In embodiments, the first inverse lapped critically sampled transform stage is configured to perform $N_{1,1}$ inverse lapped critically sampled transforms on $N_{1,1}$ sub-sets of the set of subband samples, wherein the $N_{1,1}$ lapped critically sampled transforms comprise the same framelength [e.g., mergefactor], wherein $N_{1,1}$ is a natural number greater than or equal to two.

Further embodiments provide an audio decoder, wherein the audio decoder comprises a bitstream parser configured to parse the bitstream, to obtain the encoded aliasing reduced subband representation, wherein the audio decoder comprises a decoder configured to decode the encoded aliasing reduced subband representation, to obtain the aliasing reduced subband representation of the audio signal, and wherein the audio decoder comprises an audio processor according to one of the above described embodiments.

Further embodiments provide a method for processing an audio signal to obtain a subband representation of the audio signal. The method comprises a step of performing a cascaded lapped critically sampled transform on at least two partially overlapping blocks of samples of the audio signal, to obtain a set of subband samples on the basis of a first block of samples of the audio signal, and to obtain a corresponding set of subband samples on the basis of a second block of samples of the audio signal. Further, the method comprises a step of performing a weighted combination of two corresponding sets of subband samples, one obtained on the basis of the first block of samples of the audio signal and one obtained on the basis on the second block of samples of the audio signal, to obtain an aliasing reduced subband representation of the audio signal. Thereby, performing a cascaded lapped critically sampled transform comprises segmenting a set of bins obtained on the basis of the first block of samples using at least two window functions, and to obtain at least two segmented sets of bins [e.g., at least two mergefactor bands] based on the segmented set of bins corresponding to the first block of samples, wherein performing a cascaded lapped critically sampled transform comprises segmenting a set of bins obtained on the basis of the second block of samples using the at least two window functions, and to obtain at least two sets of bins [e.g., at least two mergefactor bands] based on the segmented set of bins corresponding to the second block of samples, and wherein the sets of bins are processed [e.g., merged] using a second lapped critically sampled transform of the cascaded lapped critically sampled transform, wherein the second lapped critically sampled transform comprises performing lapped critically sampled transforms having the same framelength [e.g., mergefactor] for at least one [e.g., each] set of bins.

Further embodiments provide a method for processing a subband representation of an audio signal to obtain the audio signal. The method comprises a step of performing a weighted combination of two corresponding aliasing reduced subband representations of the audio signal, to obtain an aliased subband representation, wherein the aliased subband representation is a set of subband samples. Further, the method comprises a step of performing a cascaded inverse lapped critically sampled transform on the set of subband samples, to obtain a set of samples associated with a block of samples of the audio signal, wherein performing the cascaded inverse lapped critically sampled transform comprises performing a first inverse lapped critically sampled transform on the set of subband samples, to obtain a set of bins associated with a given subband of the audio signal, wherein performing the first inverse lapped critically sampled transform comprises performing inverse lapped critically sampled transforms having the same framelength [e.g., mergefactor] for the set of subband samples.

Embodiments provide a non-uniform filterbank with compact impulse responses that allows, by being able to follow the masking threshold more closely in both high and low frequencies, the introduction of more quantization noise, without introducing audible artifacts, thereby allowing for a lower bitrate than a uniform filterbank.

In embodiments, a division into mergefactor-bands is performed. Thereby, many entirely different merge layouts are possible. However, due to the high flexibility, it is very difficult to optimize the overall system. Therefore, in embodiments, the spectrum is divided into mergefactor-bands (MFB) within which the same mergefactor (MF) is always used (compare section 2.1.1 below.) Rectangular windows without overlap at the mergefactor-band edges can be used since all mergefactor-bands may be independently controlled in this way (compare FIG. 17).

In embodiments, joint channel processing (M/S or multi-channel coding tool (MCT) [12]) is performed. In general, M/S or MCT may also be used with subband-merging and TDAR. Mid Channels and side channels may independently use different MF parameters and TDAR parameters per frame.

In embodiments, M/S or MCT are individually switched on/off per mergefactor-band. An extension of joint stereo is to switch on/off joint stereo in a band-wise manner between the first MDCT and the second merging-MDCT. This enables the frequency-selective activation of MS/MCT, e.g. per MFB. However, TDAR is only possible between two frames with the same joint stereo configuration (e.g. no TDAR between LR and M/S).

In embodiments, a window-switching decider is used from existing methods for the mergefactor-decision. In existing methods, there are decider controls for long/short windows. In some circumstances, these deciders may also be used for MF.

In embodiments, a mergefactor is signaled in a bitstream (including entropy-coding and mutual processing of several MF parameters). Generally speaking, we use a few bits in the bitstream in order to signal the MFs for the current frame. These bits may also be entropy-coded. In addition, the bits may also be coded among themselves. Background: Varied MFs such as 2, 8, 1, 2, 16, 32 are presumably less probable than more uniform MFs such as 4, 4, 8, 8, 16, 16. This correlation may be used to save data, e.g. by differential coding.

In embodiments, less mergefactors are transmitted, wherein missing mergefactors can be derived/interpolated from neighbors. If MFs really are to be as uniform as in previous sections, all MFs could also be interpolated from a few MFs.

In embodiments, TDAR parameters are derived from MF parameters. TDAR may be transmitted as 1 bit per MFB. Alternatively, the TDAR bit may also be derived from the MF bits (the same MF parameter in two successive frames=TDAR on). Then, we do not require any side information for TDAR.

In embodiments, mutual entropy-coding of the MF parameters and TDAR parameters is performed. MF values and TDAR values may be entropy-coded in a mutual manner.

In this case, with 8 MFB and 6 MF, we do not require $$8 \times \lceil \log_2((6 \times 2)) \rceil = 32$$

but only $$\lceil \log_2((6 \times 2)^8) \rceil = 29$$

bits.

In embodiments, mergefactor-bands are divided in a non-uniform manner. For the sake of simplicity, in the below description uniform MFBs are assumed. However, these may also become non-uniform. A feasible division would presumably be identical to scalefactor-bands (SFB). Then, one scalefactor and one mergefactor are transmitted per SFB.

In embodiments, a Trellis-based optimization of the mergefactors is performed. The use of trellis grids for audio coding is already the state-of-the-art [7]. However, traditional systems can only use a single trellis; on the other hand, according to embodiments, one trellis can be used per MFB.

Further embodiments provide an audio processor for processing an audio signal to obtain a subband representation of the audio signal. The audio processor comprises a cascaded lapped critically sampled transform stage and a time domain aliasing reduction stage. The cascaded lapped critically sampled transform stage is configured to perform a cascaded lapped critically sampled transform on at least two partially overlapping blocks of samples of the audio signal, to obtain a set of subband samples on the basis of a first block of samples of the audio signal, and to obtain a corresponding set of subband samples on the basis of a second block of samples of the audio signal. The time domain aliasing reduction stage is configured to perform a weighted combination of two corresponding sets of subband samples, one obtained on the basis of the first block of samples of the audio signal and one obtained on the basis on the second block of samples of the audio signal, to obtain an aliasing reduced subband representation of the audio signal.

Further embodiments provide an audio processor for processing a subband representation of an audio signal to obtain the audio signal. The audio processor comprises an inverse time domain aliasing reduction stage and a cascaded inverse lapped critically sampled transform stage. The inverse time domain aliasing reduction stage is configured to perform a weighted (and shifted) combination of two corresponding aliasing reduced subband representations (of different blocks of partially overlapping samples) of the audio signal, to obtain an aliased subband representation, wherein the aliased subband representation is a set of subband samples. The cascaded inverse lapped critically sampled transform stage is configured to perform a cascaded inverse lapped critically sampled transform on the set of subband samples, to obtain a set of samples associated with a block of samples of the audio signal.

According to the concept of the present invention, an additional post-processing stage is added to the lapped critically sampled transform (e.g., MDCT) pipeline, the additional post-processing stage comprising another lapped critically sampled transform (e.g., MDCT) along the frequency axis and a time domain aliasing reduction along each subband time axis. This allows extracting arbitrary frequency scales from the lapped critically sampled transform (e.g., MDCT) spectrogram with an improved temporal compactness of the impulse response, while introducing no additional redundancy and a reduced lapped critically sampled transform frame delay.

Further embodiments provide a method for processing an audio signal to obtain a subband representation of the audio signal. The method comprises performing a cascaded lapped critically sampled transform on at least two partially overlapping blocks of samples of the audio signal, to obtain a set of subband samples on the basis of a first block of the audio signal, and to obtain a corresponding set of subband samples on the basis of a second block of samples of the audio signal; and performing a weighted combination of two corresponding sets of subband samples, one obtained on the basis of the first block of samples of the audio signal and one obtained on the basis on the second block of samples of the audio signal, to obtain an aliasing reduced subband representation of the audio signal.

Further embodiments provide a method for processing a subband representation of an audio signal to obtain the audio signal. The method comprises:

performing a weighted (and shifted) combination of two corresponding aliasing reduced subband representations (of different blocks of partially overlapping samples) of the audio signal, to obtain an aliased subband representation, wherein the aliased subband representation is a set of subband samples; and performing a cascaded inverse lapped critically sampled transform on the set of subband samples, to obtain a set of samples associated with a block of samples of the audio signal.

Subsequently, advantageous implementations of the audio processor for processing an audio signal to obtain a subband representation of the audio signal are described.

In embodiments, the cascaded lapped critically sampled transform stage can be a cascaded MDCT (MDCT=modified discrete cosine transform), MDST (MDST=modified discrete sine transform) or MLT (MLT=modulated lapped transform) stage.

In embodiments, the cascaded lapped critically sampled transform stage can comprise a first lapped critically sampled transform stage configured to perform lapped critically sampled transforms on a first block of samples and a second block of samples of the at least two partially overlapping blocks of samples of the audio signal, to obtain a first set of bins for the first block of samples and a second set of bins (lapped critically sampled coefficients) for the second block of samples.

The first lapped critically sampled transform stage can be a first MDCT, MDST or MLT stage.

The cascaded lapped critically sampled transform stage can further comprise a second lapped critically sampled transform stage configured to perform a lapped critically sampled transform on a segment (proper subset) of the first set of bins and to perform a lapped critically sampled transform on a segment (proper subset) of the second set of bins, each segment being associated with a subband of the audio signal, to obtain a set of subband samples for the first set of bins and a set of subband samples for the second set of bins.

The second lapped critically sampled transform stage can be a second MDCT, MDST or MLT stage.

Thereby, the first and second lapped critically sampled transform stages can be of the same type, i.e. one out of MDCT, MDST or MLT stages.

In embodiments, the second lapped critically sampled transform stage can be configured to perform lapped critically sampled transforms on at least two partially overlapping segments (proper subsets) of the first set of bins and to perform lapped critically sampled transforms on at least two partially overlapping segments (proper subsets) of the second set of bins, each segment being associated with a subband of the audio signal, to obtain at least two sets of subband samples for the first set of bins and at least two sets of subband samples for the second set of bins.

Thereby, the first set of subband samples can be a result of a first lapped critically sampled transform on the basis of the first segment of the first set of bins, wherein a second set of subband samples can be a result of a second lapped critically sampled transform on the basis of the second segment of the first set of bins, wherein a third set of subband samples can be a result of a third lapped critically sampled transform on the basis of the first segment of the second set of bins, wherein a fourth set of subband samples can be a result of a fourth lapped critically sampled transform on the basis of the second segment of the second set of bins. The time domain aliasing reduction stage can be configured to perform a weighted combination of the first set of subband samples and the third set of subband samples, to obtain a first aliasing reduced subband representation of the audio signal, and to perform a weighted combination of the second set of subband samples and the fourth set of subband samples, to obtain a second aliasing reduced subband representation of the audio signal.

In embodiments, the cascaded lapped critically sampled transform stage can be configured to segment a set of bins obtained on the basis of the first block of samples using at least two window functions and to obtain at least two sets of subband samples based on the segmented set of bins corresponding to the first block of samples, wherein the cascaded lapped critically sampled transform stage can be configured to segment a set of bins obtained on the basis of the second block of samples using the at least two window functions and to obtain at least two sets of subband samples based on the segmented set of bins corresponding to the second block of samples, wherein the at least two window functions comprise different window width.

In embodiments, the cascaded lapped critically sampled transform stage can be configured to segment a set of bins obtained on the basis of the first block of samples using at least two window functions and to obtain at least two sets of subband samples based on the segmented set of bins corresponding to the first block of samples, wherein the cascaded lapped critically sampled transform stage can be configured to segment a set of bins obtained on the basis of the second block of samples using the at least two window functions and to obtain at least two sets of subband samples based on the segmented set of bins corresponding to the second block of samples, wherein filter slopes of the window functions corresponding to adjacent sets of subband samples are symmetric.

In embodiments, the cascaded lapped critically sampled transform stage can be configured to segment the samples of the audio signal into the first block of samples and the second block of samples using a first window function, wherein the lapped critically sampled transform stage can be configured to segment a set of bins obtained on the basis of the first block of samples and a set of bins obtained on the basis of the second block of samples using a second window function, to obtain the corresponding subband samples, wherein the first window function and the second window function comprise different window width.

In embodiments, the cascaded lapped critically sampled transform stage can be configured to segment the samples of the audio signal into the first block of samples and the second block of samples using a first window function, wherein the lapped critically sampled transform stage can be configured to segment a set of bins obtained on the basis of the first block of samples and a set of bins obtained on the basis of the second block of samples using a second window function, to obtain the corresponding subband samples, wherein a window width of the first window function and a window width of the second window function are different from each other, wherein the window width of the first window function and the window width of the second window function differ from each other by a factor different from a power of two.

Subsequently, advantageous implementations of the audio processor for processing a subband representation of an audio signal to obtain the audio signal are described.

In embodiments, the inverse cascaded lapped critically sampled transform stage can be an inverse cascaded MDCT (MDCT=modified discrete cosine transform), MDST (MDST=modified discrete sine transform) or MLT (MLT=modulated lapped transform) stage.

In embodiments, the cascaded inverse lapped critically sampled transform stage can comprise a first inverse lapped critically sampled transform stage configured to perform an inverse lapped critically sampled transform on the set of subband samples, to obtain a set of bins associated with a given subband of the audio signal.

The first inverse lapped critically sampled transform stage can be a first inverse MDCT, MDST or MLT stage.

In embodiments, the cascaded inverse lapped critically sampled transform stage can comprise a first overlap and add stage configured to perform a concatenation of a set of bins associated with a plurality of subbands of the audio signal, which comprises a weighted combination of the set of bins associated with the given subband of the audio signal with a set of bins associated with another subband of the audio signal, to obtain a set of bins associated with a block of samples of the audio signal.

In embodiments, the cascaded inverse lapped critically sampled transform stage can comprise a second inverse lapped critically sampled transform stage configured to perform an inverse lapped critically sampled transform on the set of bins associated with the block of samples of the audio signal, to obtain a set of samples associated with the block of samples of the audio signal.

The second inverse lapped critically sampled transform stage can be a second inverse MDCT, MDST or MLT stage.

Thereby, the first and second inverse lapped critically sampled transform stages can be of the same type, i.e. one out of inverse MDCT, MDST or MLT stages.

In embodiments, the cascaded inverse lapped critically sampled transform stage can comprise a second overlap and add stage configured to overlap and add the set of samples associated with the block of samples of the audio signal and another set of samples associated with another block of samples of the audio signal, the block of samples and the another block of samples of the audio signal partially overlapping, to obtain the audio signal.

BRIEF DESCRIPTION OF THE DRAWINGS

Embodiments of the present invention are described herein making reference to the appended drawings, in which:

FIG. 10 shows a flowchart of a method for processing an audio signal to obtain a subband representation of the audio signal, according to an embodiment;

FIG. 11 shows a flowchart of a method for processing a subband representation of an audio signal to obtain the audio signal, according to an embodiment;

FIG. 20 lists in a table quality settings and their distortion parameter q and resulting average bitrate;

FIG. 21 lists in a table different test items;

FIG. 26 shows a flowchart of a method for processing an audio signal to obtain a subband representation of the audio signal, according to an embodiment; and FIG. 27 shows a flowchart of a method for processing a subband representation of an audio signal to obtain the audio signal, according to an embodiment.

DETAILED DESCRIPTION OF THE INVENTION

Figure 1:
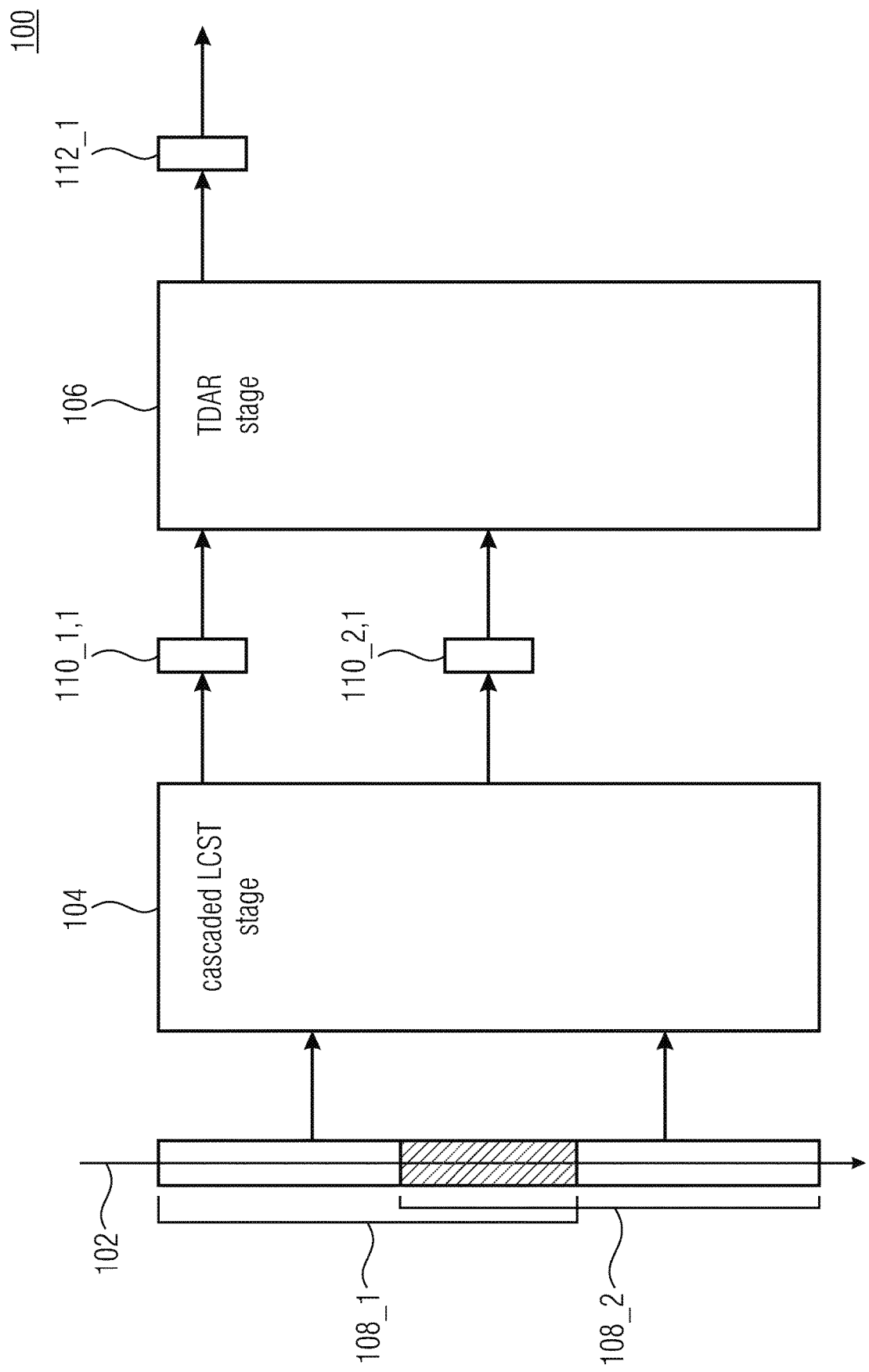
FIG. 1 shows a schematic block diagram of an audio processor configured to process an audio signal to obtain a subband representation of the audio signal, according to an embodiment.

Equal or equivalent elements or elements with equal or equivalent functionality are denoted in the following description by equal or equivalent reference numerals.

In the following description, a plurality of details are set forth to provide a more thorough explanation of embodiments of the present invention. However, it will be apparent to one skilled in the art that embodiments of the present invention may be practiced without these specific details. In other instances, well-known structures and devices are shown in block diagram form rather than in detail in order to avoid obscuring embodiments of the present invention. In addition, features of the different embodiments described hereinafter may be combined with each other, unless specifically noted otherwise.

First, in section 1, a nonuniform orthogonal filterbank based on cascading two MDCT and time domain aliasing reduction (TDAR) is described, which is able to achieve impulse responses that were compact in both time and frequency [1]. Afterwards, in section 2, the perceptual quality of such a non-uniform filterbank in an audio coder scenario is evaluated and compared to the performance of a uniform filterbank with window switching as used in current coders, such as Advanced Audio Coding (AAC) [2].

1. Nonuniform Orthogonal Filterbank Based on Cascading Two MDCT and Time Domain Aliasing Reduction (TDAR)

FIG. 1 shows a schematic block diagram of an audio processor 100 configured to process an audio signal 102 to obtain a subband representation of the audio signal, according to an embodiment. The audio processor 100 comprises a cascaded lapped critically sampled transform (LCST) stage 104 and a time domain aliasing reduction (TDAR) stage 106.

The cascaded lapped critically sampled transform stage 104 is configured to perform a cascaded lapped critically sampled transform on at least two partially overlapping blocks 108_1 and 108_2 of samples of the audio signal 102, to obtain a set 110_1,1 of subband samples on the basis of a first block 108_1 of samples (of the at least two overlapping blocks 108_1 and 108_2 of samples) of the audio signal 102, and to obtain a corresponding set 110_2,1 of subband samples on the basis of a second block 108_2 of samples (of the at least two overlapping blocks 108_1 and 108_2 of samples) of the audio signal 102.

The time domain aliasing reduction stage 104 is configured to perform a weighted combination of two corresponding sets 110_1,1 and 110_2,1 of subband samples (i.e., subband samples corresponding to the same subband), one obtained on the basis of the first block 108_1 of samples of the audio signal 102 and one obtained on the basis of the second block 108_2 of samples of the audio signal, to obtain an aliasing reduced subband representation 112_1 of the audio signal 102.

In embodiments, the cascaded lapped critically sampled transform stage 104 can comprise at least two cascaded lapped critically sampled transform stages, or in other words, two lapped critically sampled transform stages connected in a cascaded manner.

The cascaded lapped critically sampled transform stage can be a cascaded MDCT (MDCT=modified discrete cosine transform) stage. The cascaded MDCT stage can comprise at least two MDCT stages.

Naturally, the cascaded lapped critically sampled transform stage also can be a cascaded MDST (MDST=modified discrete sine transform) or MLT (MLT=modulated lap transform) stage, comprising at least two MDST or MLT stages, respectively.

The two corresponding sets of subband samples 110_1,1 and 110_2,1 can be subband samples corresponding to the same subband (i.e. frequency band).

Figure 2:
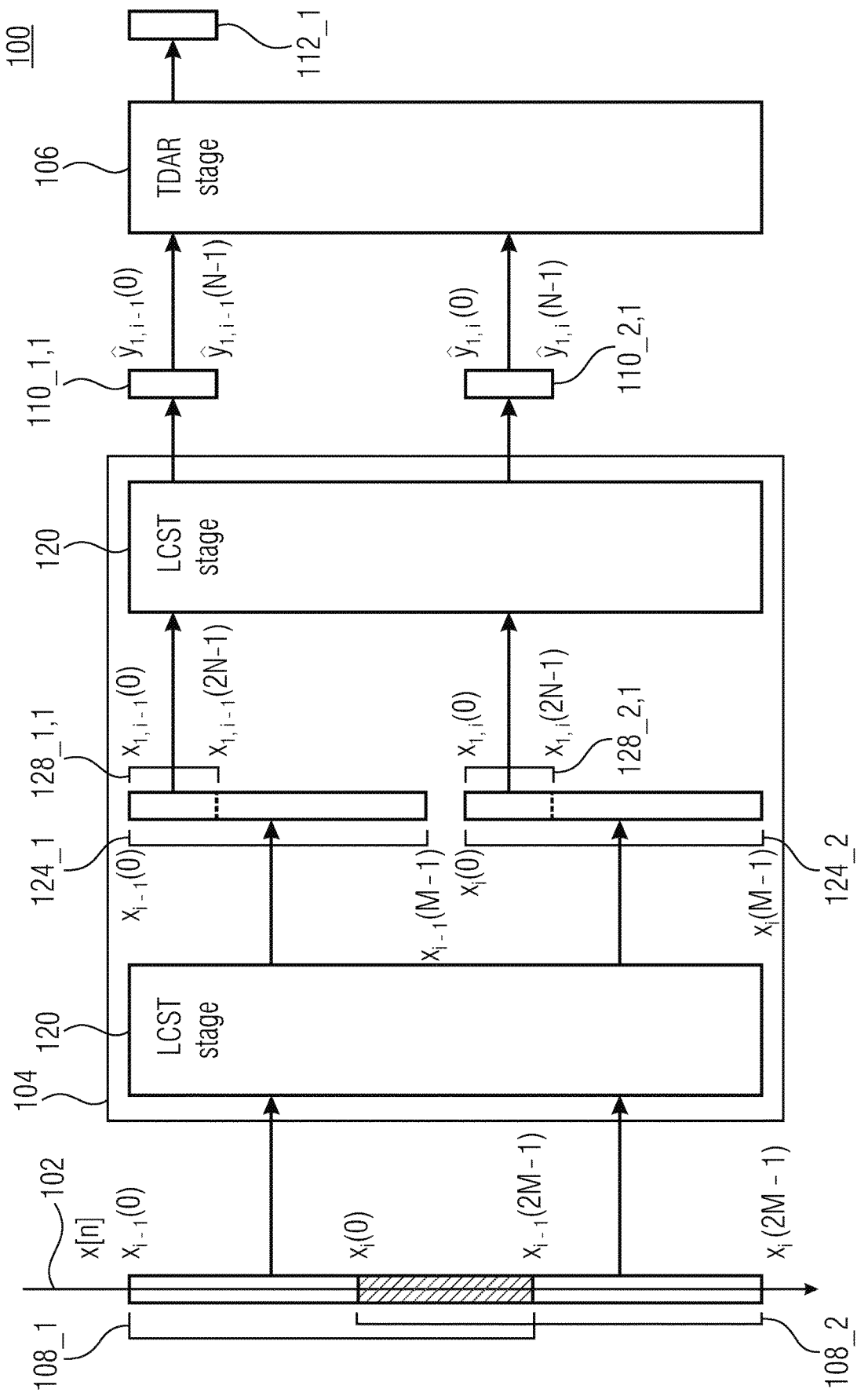
FIG. 2 shows a schematic block diagram of an audio processor configured to process an audio signal to obtain a subband representation of the audio signal, according to a further embodiment.

FIG. 2 shows a schematic block diagram of an audio processor 100 configured to process an audio signal 102 to obtain a subband representation of the audio signal, according to a further embodiment.

As shown in FIG. 2, the cascaded lapped critically sampled transform stage 104 can comprise a first lapped critically sampled transform stage 120 configured to perform lapped critically sampled transforms on a first block 108_1 of (2M) samples ($x_{i-1}(n)$, $0 \le n \le 2M-1$) and a second block 108_2 of (2M) samples ($x_i(n)$, $0 \le n \le 2M-1$) of the at least two partially overlapping blocks 108_1 and 108_2 of samples of the audio signal 102, to obtain a first set 124_1 of (M) bins (LCST coefficients) ($X_{i-1}(k)$, $0 \le k \le M-1$) for the first block 108_1 of samples and a second set 124_2 of (M) bins (LCST coefficients) ($Xi(k)$, $0 \le k \le M-1$) for the second block 108_2 of samples.

The cascaded lapped critically sampled transform stage 104 can comprise a second lapped critically sampled transform stage 126 configured to perform a lapped critically sampled transform on a segment 128_1,1 (proper subset) ($X_{v,i-1}(k)$) of the first set 124_1 of bins and to perform a lapped critically sampled transform on a segment 128_2,1 (proper subset) ($X_{v,1}(k)$) of the second set 124_2 of bins, each segment being associated with a subband of the audio signal 102, to obtain a set 110_1,1 of subband samples [$\hat{y}_{v,i-1}(m)$] for the first set 124_1 of bins and a set 110_2,1 of subband samples ($\hat{y}_{v,1}(m)$) for the second set 124_2 of bins.

Figure 3:
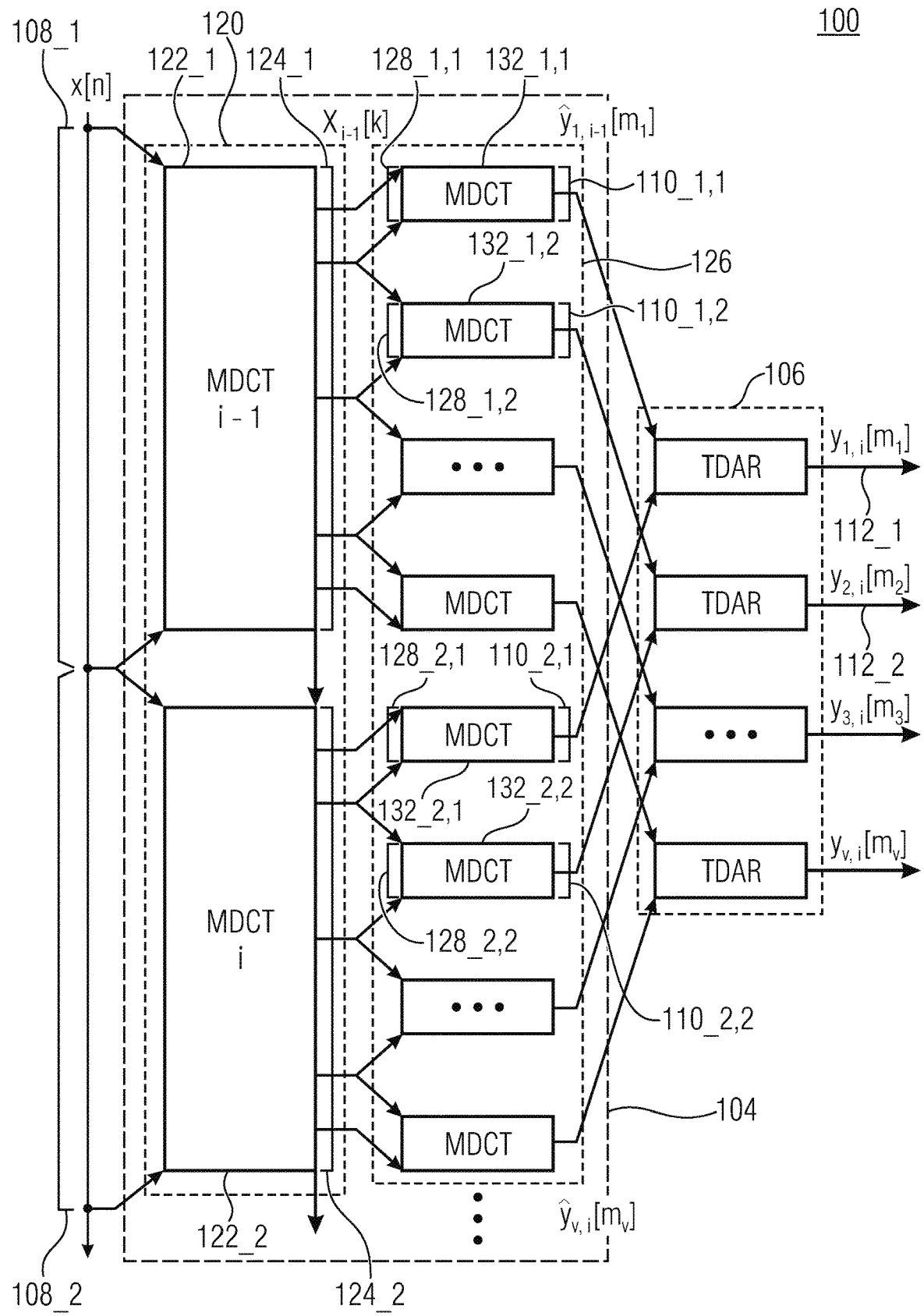
FIG. 3 shows a schematic block diagram of an audio processor configured to process an audio signal to obtain a subband representation of the audio signal, according to a further embodiment.

FIG. 3 shows a schematic block diagram of an audio processor 100 configured to process an audio signal 102 to obtain a subband representation of the audio signal, according to a further embodiment. In other words, FIG. 3 shows a diagram of the analysis filterbank. Thereby, appropriate window functions are assumed. Observe that for simplicity reasons in FIG. 3 (only) the processing of a first half of a subband frame (y[m], $0<=m<N/2$) (i.e. only the first line of equation (6)) is indicated.

As shown in FIG. 3, the first lapped critically sampled transform stage 120 can be configured to perform a first lapped critically sampled transform 122_1 (e.g., MDCT i-1) on the first block 108_1 of (2M) samples ($x_{i-1}(n)$, $0 \le n \le 2M-1$), to obtain the first set 124_1 of (M) bins (LCST coefficients) ($X_{i-1}(k)$, $0 \le k \le M-1$) for the first block 108_1 of samples, and to perform a second lapped critically sampled transform 122_2 (e.g., MDCT i) on the second block 108_2 of (2M) samples ($x_i(n)$, $0 \le n \le 2M-1$), to obtain a second set 124_2 of (M) bins (LCST coefficients) ($Xi(k)$, $0 \le k \le M-1$) for the second block 108_2 of samples.

In detail, the second lapped critically sampled transform stage 126 can be configured to perform lapped critically sampled transforms on at least two partially overlapping segments 128_1,1 and 128_1,2 (proper subsets) ($X_{v,i-1}(k)$) of the first set 124_1 of bins and to perform lapped critically sampled transforms on at least two partially overlapping segments 128_2,1 and 128_2,2 (proper subsets) ($X_{v,1}(k)$) of the second set of bins, each segment being associated with a subband of the audio signal, to obtain at least two sets 110_1,1 and 110_1,2 of subband samples ($\hat{y}_{v,i-1}(m)$) for the first set 124_1 of bins and at least two sets 110_2,1 and 110_2,2 of subband samples ($\hat{y}_{v,1}(m)$) for the second set 124_2 of bins.

For example, the first set 110_1,1 of subband samples can be a result of a first lapped critically sampled transform 132_1,1 on the basis of the first segment 132_1,1 of the first set 124_1 of bins, wherein the second set 110_1,2 of subband samples can be a result of a second lapped critically sampled 132_1,2 transform on the basis of the second segment 128_1,2 of the first set 124_1 of bins, wherein the third set 110_2,1 of subband samples can be a result of a third lapped critically sampled transform 132_2,1 on the basis of the first segment 128_2,1 of the second set 124_2 of bins, wherein the fourth set 110_2,2 of subband samples can be a result of a fourth lapped critically sampled transform 132 . . . 2,2 on the basis of the second segment 128_2,2 of the second set 124_2 of bins.

Thereby, the time domain aliasing reduction stage 106 can be configured to perform a weighted combination of the first set 110_1,1 of subband samples and the third set 110_2,1 of subband samples, to obtain a first aliasing reduced subband representation 1121 ($y_{1,i}[m_1]$) of the audio signal, wherein the domain aliasing reduction stage 106 can be configured to perform a weighted combination of the second set 110_1,2 of subband samples and the fourth set 110_2,2 of subband samples, to obtain a second aliasing reduced subband representation 112_2 ($y_{2,i}[m_2]$) of the audio signal.

Figure 4:
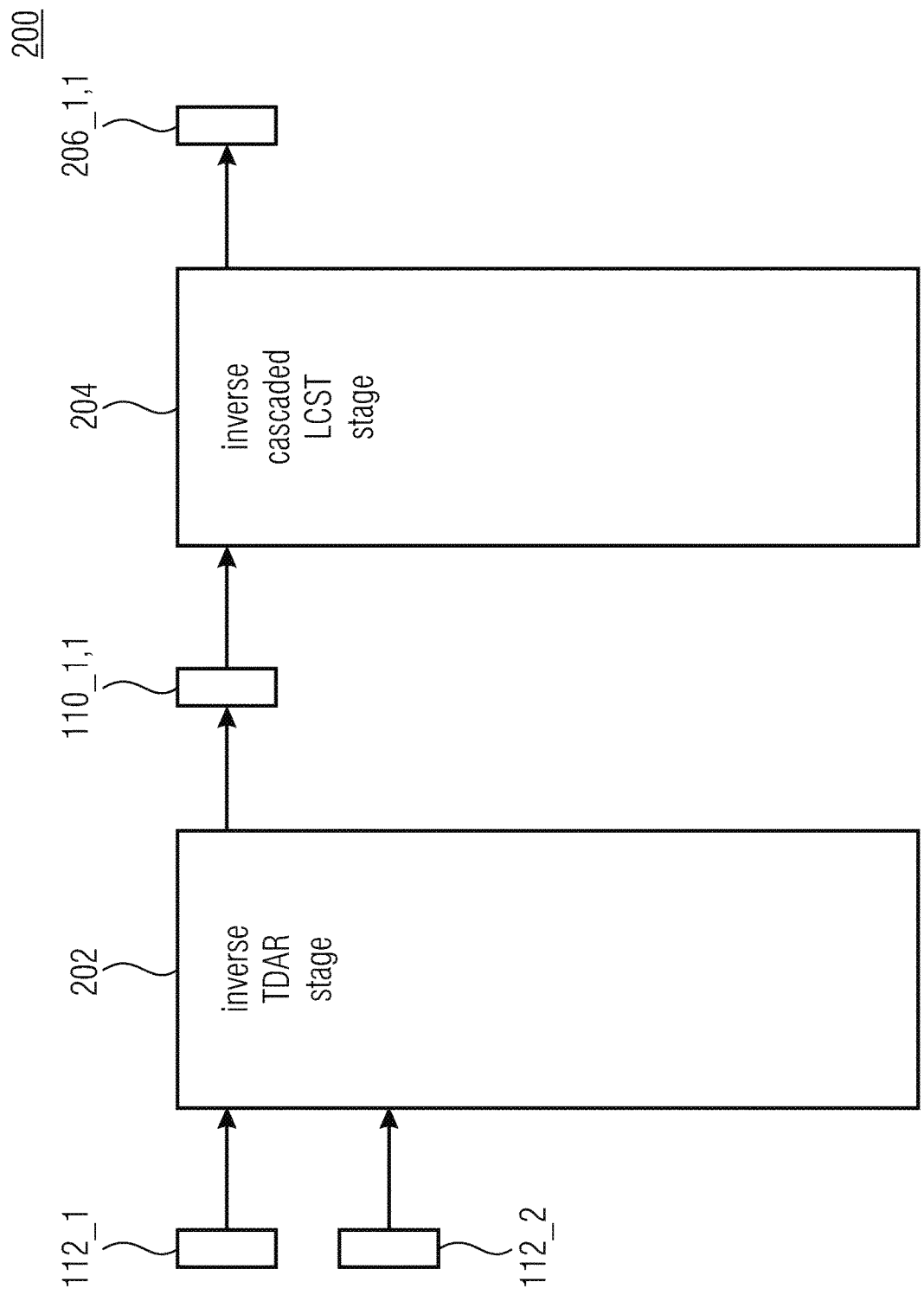
FIG. 4 shows a schematic block diagram of an audio processor for processing a subband representation of an audio signal to obtain the audio signal, according to an embodiment.

FIG. 4 shows a schematic block diagram of an audio processor 200 for processing a subband representation of an audio signal to obtain the audio signal 102, according to an embodiment. The audio processor 200 comprises an inverse time domain aliasing reduction (TDAR) stage 202 and a cascaded inverse lapped critically sampled transform (LCST) stage 204.

The inverse time domain aliasing reduction stage 202 is configured to perform a weighted (and shifted) combination of two corresponding aliasing reduced subband representations 112_1 and 112_2 ($y_{v,1}(m)$, $y_{v,i-1}(m)$) of the audio signal 102, to obtain an aliased subband representation 110_1 ($\hat{y}_{v,1}(m)$), wherein the aliased subband representation is a set 110_1 of subband samples.

The cascaded inverse lapped critically sampled transform stage 204 is configured to perform a cascaded inverse lapped critically sampled transform on the set 110_1 of subband samples, to obtain a set of samples associated with a block 108_1 of samples of the audio signal 102.

Figure 5:
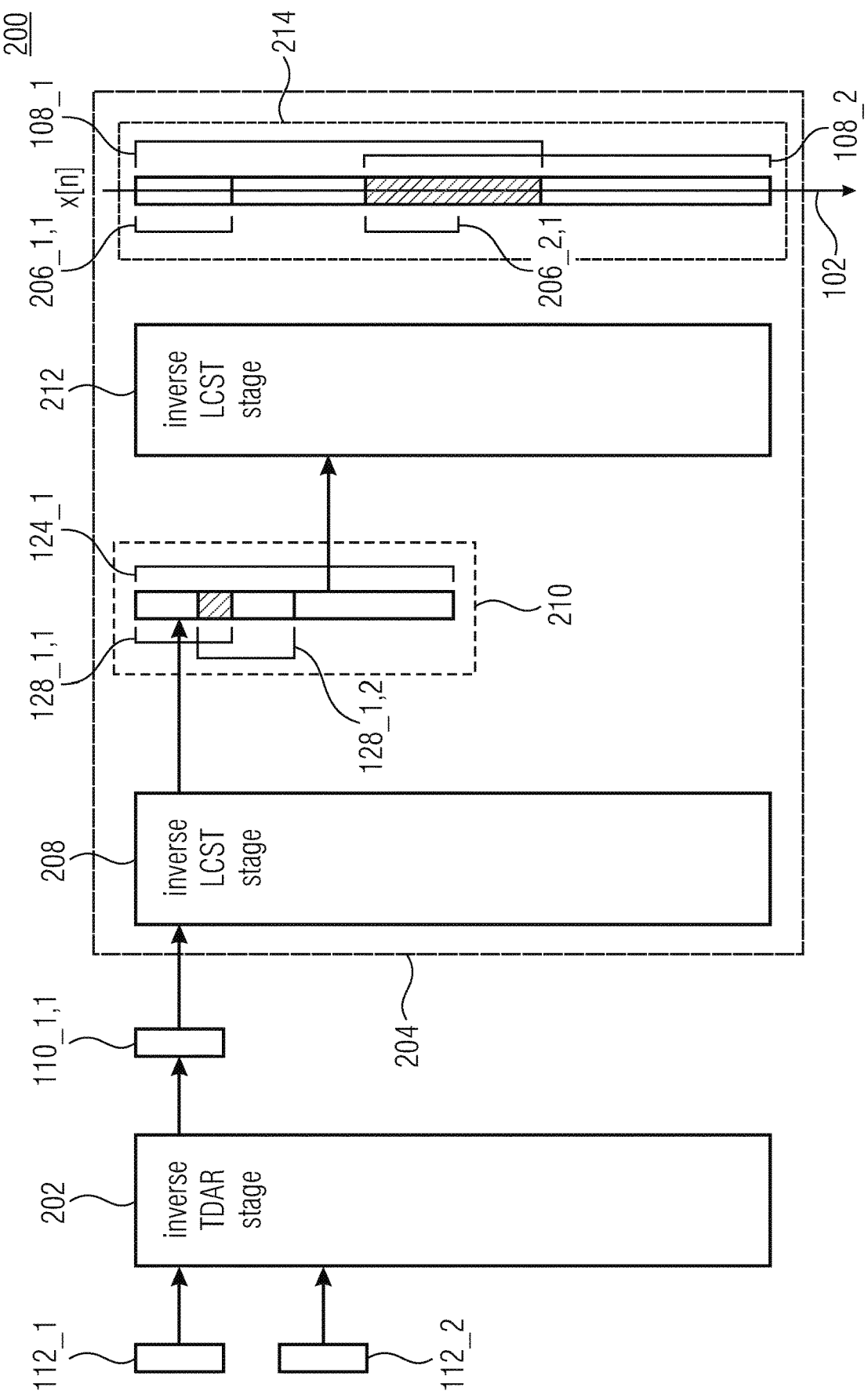
FIG. 5 shows a schematic block diagram of an audio processor for processing a subband representation of an audio signal to obtain the audio signal, according to a further embodiment.

FIG. 5 shows a schematic block diagram of an audio processor 200 for processing a subband representation of an audio signal to obtain the audio signal 102, according to a further embodiment. The cascaded inverse lapped critically sampled transform stage 204 can comprise a first inverse lapped critically sampled transform (LCST) stage 208 and a first overlap and add stage 210.

The first inverse lapped critically sampled transform stage 208 can be configured to perform an inverse lapped critically sampled transform on the set 110_1,1 of subband samples, to obtain a set 128_1,1 of bins associated with a given subband of the audio signal ($\hat{X}v,i(k)$).

The first overlap and add stage 210 can be configured to perform a concatenation of sets of bins associated with a plurality of subbands of the audio signal, which comprises a weighted combination of the set 128_1,1 of bins ($\hat{X}_{v,i}(k)$) associated with the given subband (v) of the audio signal 102 with a set 128_1,2 of bins ($\hat{X}_{v-1,i}(k)$) associated with another subband (v−1) of the audio signal 102, to obtain a set 124_1 of bins associated with a block 108_1 of samples of the audio signal 102.

As shown in FIG. 5, the cascaded inverse lapped critically sampled transform stage 204 can comprise a second inverse lapped critically sampled transform (LCST) stage 212 configured to perform an inverse lapped critically sampled transform on the set 124_1 of bins associated with the block 108_1 of samples of the audio signal 102, to obtain a set 206_1,1 of samples associated with the block 108_1 of samples of the audio signal 102.

Further, the cascaded inverse lapped critically sampled transform stage 204 can comprise a second overlap and add stage 214 configured to overlap and add the set 206_1,1 of samples associated with the block 108_1 of samples of the audio signal 102 and another set 206_2,1 of samples associated with another block 108_2 of samples of the audio signal, the block 108_1 of samples and the another block 108_2 of samples of the audio signal 102 partially overlapping, to obtain the audio signal 102.

Figure 6:
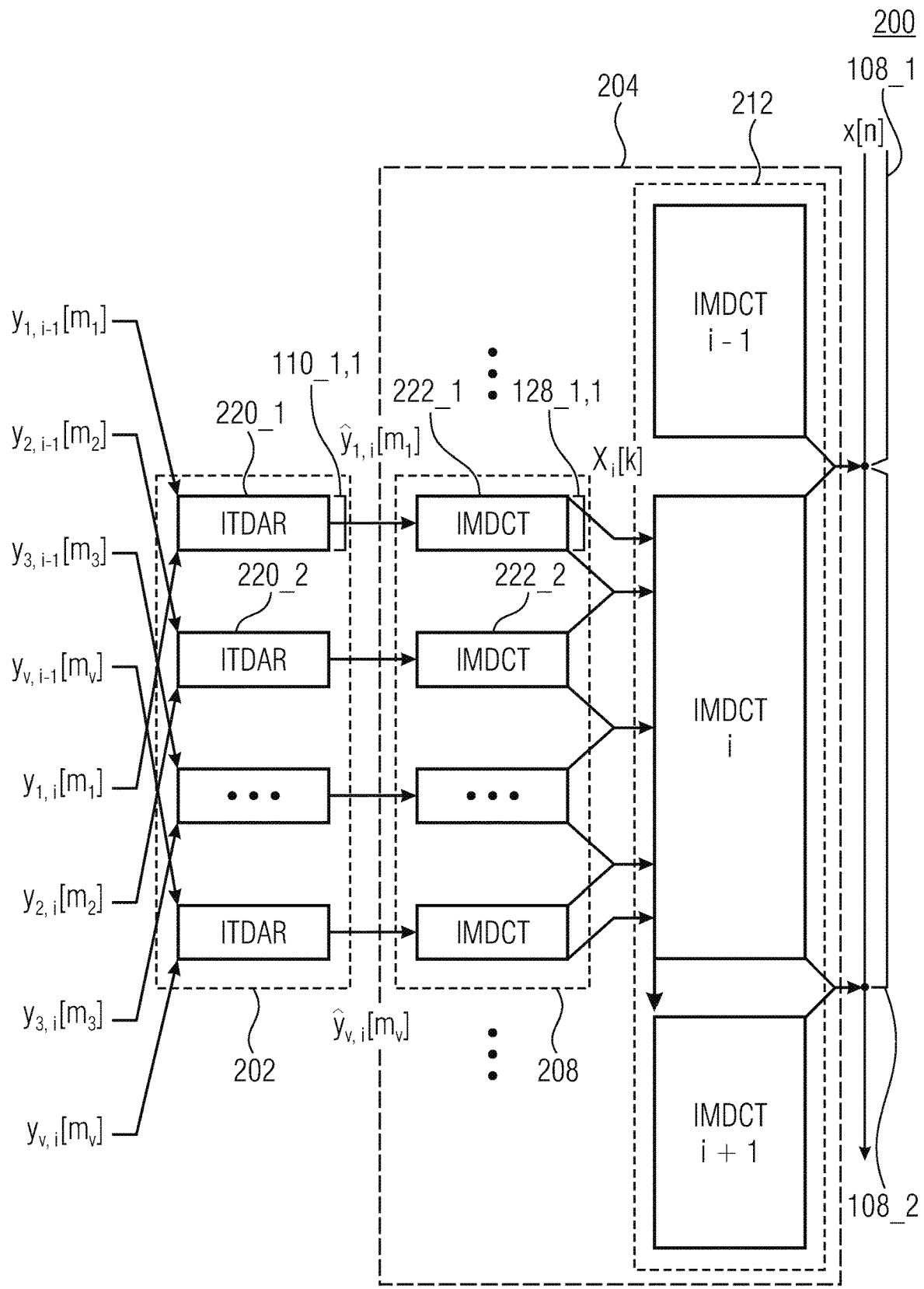
FIG. 6 shows a schematic block diagram of an audio processor for processing a subband representation of an audio signal to obtain the audio signal, according to a further embodiment.

FIG. 6 shows a schematic block diagram of an audio processor 200 for processing a subband representation of an audio signal to obtain the audio signal 102, according to a further embodiment. In other words, FIG. 6 shows a diagram of the synthesis filter bank. Thereby, appropriate windows functions are assumed. Observe that for simplicity reasons in FIG. 6 (only) the processing of a first half of a subband frame (y[m], 0<=m<N/2) (i.e. only the first line of equation (6)) is indicated.

As described above, the audio processor 200 comprises an inverse time domain aliasing reduction stage 202 and an inverse cascades lapped critically sampled stage 204 comprising a first inverse lapped critically sampled stage 208 and a second inverse lapped critically sampled stage 212.

The inverse time domain reduction stage 104 is configured to perform a first weighted and shifted combination 220_1 of a first and second aliasing reduced subband representations $y_{1,i-1}[m_1]$ and $y_{1,i}[m_1]$ to obtain a first aliased subband representation 110_1,1 $\hat{y}_{1,i}[m_1]$, wherein the aliased subband representation is a set of subband samples, and to perform a second weighted and shifted combination 220_2 of a third and fourth aliasing reduced subband representations $y_{1,i-1}[m_1]$ and $y_{2,i}[m_1]$ to obtain a second aliased subband representation 110_2,1 $\hat{y}_{2,i}[m_1]$, wherein the aliased subband representation is a set of subband samples.

The first inverse lapped critically sampled transform stage 208 is configured to perform a first inverse lapped critically sampled transform 222_1 on the first set of subband samples 110_1,1 $\hat{y}_{1,i}[m_1]$ to obtain a set 128_1,1 of bins associated with a given subband of the audio signal ($\hat{X}_{1,1}(k)$), and to perform a second inverse lapped critically sampled transform 222_2 on the second set of subband samples 110_2,1 $\hat{y}_{2,i}[m_1]$ to obtain a set 128_2,1 of bins associated with a given subband of the audio signal ($\hat{X}_{2,1}(k)$).

The second inverse lapped critically sampled transform stage 212 is configured to perform an inverse lapped critically sampled transform on an overlapped and added set of bins obtained by overlapping and adding the sets of bins 128_1,1 and 128_21 provided by the first inverse lapped critically sampled transform stage 208, to obtain the block of samples 108_2.

Subsequently, embodiments of the audio processors shown in FIGS. 1 to 6 are described in which it is exemplarily assumed that the cascaded lapped critically sampled transform stage 104 is a MDCT stage, i.e. the first and second lapped critically sampled transform stages 120 and 126 are MDCT stages, and the inverse cascaded lapped critically sampled transform stage 204 is an inverse cascaded MDCT stage, i.e. the first and second inverse lapped critically sampled transform stages 120 and 126 are inverse MDCT stages. Naturally, the following description is also applicable to other embodiments of the cascaded lapped critically sampled transform stage 104 and inverse lapped critically sampled transform stage 204, such as to a cascaded MDST or MLT stage or an inverse cascaded MDST or MLT stage.

Thereby, the described embodiments may work on a sequence of MDCT spectra of limited length and use MDCT and time domain aliasing reduction (TDAR) as the subband merging operation. The resulting non-uniform filterbank is lapped, orthogonal and allows for subband widths k=2n with n∈N. Due to TDAR, a both temporally and spectral more compact subband impulse response can be achieved.

Subsequently, embodiments of the filterbank are described.

The filterbank implementation directly builds upon common lapped MDCT transformation schemes: The original transform with overlap and windowing remains unchanged.

Without loss of generality the following notation assumes orthogonal MDCT transforms, e.g.

$$x_i(n) = x(n + iM) \quad 0 \le n \le 2M \tag{1}$$

$$X_i(k) = \sqrt{\frac{2}{M}} \sum_{n=0}^{2M-1} h(n) x_i(n) \kappa(k, n, M) \quad 0 \le k < M \tag{2}$$

where k(k, n, M) is the MDCT transform kernel and h(n) a suitable analysis window $$\kappa(k, n, M) = \cos\left[\frac{\pi}{M}\left(k + \frac{1}{2}\right)\left(n + \frac{M+1}{2}\right)\right]. \tag{3}$$

The output of this transform $X_i(k)$ is then segmented into v subbands of individual widths $N_v$ and transformed again using MDCT. This results in a filterbank with overlap in both temporal and spectral direction.

For sake of simpler notation herein one common merge factor N for all subbands is used, however any valid MDCT window switching/sequencing can be used to implement the desired time-frequency resolution. More on resolution design below.

$$X_{v,i}(k) = X_i(k + vN) \quad 0 \le k < 2N \tag{4}$$

$$\hat{y}_{v,i}(m) = \sqrt{\frac{2}{N}} \sum_{k=0}^{2N-1} w(k) X_{v,i}(k) \kappa(m, k, N) \quad 0 \le m < N \tag{5}$$

where w(k) is a suitable analysis window and generally differs from h(n) in size and may differ in window type. Since embodiments apply the window in the frequency domain it is noteworthy though that time- and frequency-selectivity of the window are swapped.

For proper border handling an additional offset of N/2 can be introduced in equation (4), combined with rectangular start/stop window halves at the borders. Again for sake of simpler notation this offset has not been taken into account here.

The output $\hat{y}_{v,i}(m)$ is a list of v vectors of individual lengths $N_v$ of coefficients with corresponding bandwidths $$\pi \frac{N_v}{M}$$

and a temporal resolution proportional to that bandwidth.

These vectors however contain aliasing from the original MDCT transform and consequently show poor temporal compactness. To compensate this aliasing TDAR may be facilitated.

The samples used for TDAR are taken from the two adjacent subband sample blocks v in the current and previous MDCT frame i and i−1. The result is reduced aliasing in the second half of the previous frame and the first half of the second frame.

$$\begin{bmatrix} y_{v,i}(m) \\ y_{v,i-1}(N-1-m) \end{bmatrix} = A \begin{bmatrix} \hat{y}_{v,i}(m) \\ \hat{y}_{v,i-1}(N-1-m) \end{bmatrix} \quad (6)$$

for 0≤m<N/2 with $$A = \begin{bmatrix} a_v(m) & b_v(m) \\ c_v(m) & d_v(m) \end{bmatrix} \quad (7)$$

The TDAR coefficients $a_v(m)$, $b_v(m)$, $c_v(m)$ and $d_v(m)$ can be designed to minimize residual aliasing. A simple estimation method based on the synthesis window g(n) will be introduced below.

Also note that if A is nonsingular the operations (6) and (8) correspond to a biorthogonal system. Additionally if g(n)=h(n) and v(k)=w(k), e.g. both MDCTs are orthogonal, and matrix A is orthogonal the overall pipeline constitutes an orthogonal transform.

To calculate the inverse transform, first inverse TDAR is performed, $$\begin{bmatrix} \hat{y}_{v,i}(m) \\ \hat{y}_{v,i-1}(N-1-m) \end{bmatrix} = A^{-1} \begin{bmatrix} y_{v,i}(m) \\ y_{v,i-1}(N-1-m) \end{bmatrix} \quad (8)$$

followed by inverse MDCT and time domain aliasing cancellation (TDAC, albeit the aliasing cancellation is done along the frequency axis here) is performed to cancel the aliasing produced in Equation 5

$$\hat{X}_{v,i}(k) = \sqrt{\frac{2}{N}} \sum_{m=0}^{N-1} \hat{y}_{v,i}(m) \kappa(k, m, N) \quad 0 \le k < 2N \quad (9)$$

$$X_{v,i}(k) = v(k+N)\hat{X}_{v-1,i}(k+N) + v(k)\hat{X}_{v,i}(k) \quad (10)$$

$$X_i(k+vN) = X_{v,i}(k). \quad (11)$$

Finally, the initial MDCT in Equation 2 is inverted and again TDAC is performed $$\hat{x}_i(n) = \sqrt{\frac{2}{M}} \sum_{k=0}^{M-1} X_i(k) \kappa(n, k, M) \quad 0 \le n < 2M \quad (12)$$

$$x_i(n) = g(n+M)\hat{x}_{i-1}(n+M) + g(n)\hat{x}_i(n) \quad (13)$$

$$x(n+iM) = x_i(n) \quad (14)$$

Subsequently, time-frequency resolution design limitations are described. While any desired time-frequency resolution is possible, some constraints for designing the resulting window functions are adhered to to ensure invertibility. In particular, the slopes of two adjacent subbands can be symmetric so that Equation (6) fulfills the Princen Bradley condition [J. Princen, A. Johnson, and A. Bradley, "Subband/transform coding using filter bank designs based on time domain aliasing cancellation," in Acoustics, Speech, and Signal Processing, IEEE International Conference on ICASSP '87, April 1987, vol. 12, pp. 2161-2164]. The window switching scheme as introduced in [B. Edler, "Codierung von Audiosignalen mit überlappender Transformation und adaptiven Fensterfunktionen," Frequenz, vol. 43, pp. 252-256, September 1989], originally designed to combat pre-echo effects, can be applied here. See [Olivier Derrien, Thibaud Necciari, and Peter Balazs, "A quasi-orthogonal, invertible, and perceptually relevant time-frequency transform for audio coding," in EUSIPCO, Nice, France. August 2015.].

Secondly, the sum of all second MDCT transform lengths adds up to the total length of provided MDCT coefficients. Bands may be chosen not to be transformed using a unit step window with zeros at the desired coefficients. The symmetry properties of the neighboring windows is taken care of, though [B. Edler, "Codierung von Audiosignalen mit überlappender Transformation und adaptiven Fensterfunktionen." Frequenz, vol. 43, pp. 252-256, September 1989.]. The resulting transform will yield zeros in these bands so the original coefficients may be directly used.

As a possible time-frequency resolution scalefactor bands from most modern audio coders may directly be used.

Subsequently, the time domain aliasing reduction (TDAR) coefficients calculation is described.

Following the aforementioned temporal resolution, each subband sample corresponds to $M/N_v$ original samples, or an interval $N_v$ times the size as the one of an original sample.

Furthermore, the amount of aliasing in each subband sample depends on the amount of aliasing in the interval it is representing. As the aliasing is weighted with the analysis window h(n) using an approximate value of the synthesis window at each subband sample interval is assumed to be a good first estimate for a TDAR coefficient.

Experiments have shown that two very simple coefficient calculation schemes allow for good initial values with improved both temporal and spectral compactness. Both methods are based on a hypothetical synthesis window $g_v(m)$ of length $2N_v$.

1) For parametric windows like Sine or Kaiser Bessel Derived a simple, shorter window of the same type can be defined.

2) For both parametric and tabulated windows with no closed representation the window may be simply cut into $2N_v$ sections of equal size, allowing coefficients to be obtained using the mean value of each section:

$$g_v(m) = \frac{1}{N_v/M} \sum_{n=1}^{N_v/M} g(mN_v/M + n) \quad 0 \le m < 2N_v \quad (15)$$

Taking the MDCT boundary conditions and aliasing mirroring into account this then yields TDAR coefficients $$a_v(m) = g_v(N/2+m) \quad (16)$$

$$b_v(m) = -g_v(N/2-1-m) \quad (17)$$

$$c_v(m) = g_v(3N/2+m) \quad (18)$$

$$d_v(m) = g_v(3N/2-1-m) \quad (19)$$

or in case of an orthogonal transform $$a_v(m) = d_v(m) = g_v(N/2+m) \quad (20)$$

$$-b_v(m) = c_v(m) = 1 - a_v(m)^2. \quad (21)$$

Whatever coefficient approximation solution was chosen, as long as A is nonsingular perfect reconstruction of the entire filterbank is preserved. An otherwise suboptimal coefficient selection will only affect the amount of residual aliasing in the subband signal $y_{v,i}(m)$, however not in the signal $x(n)$ synthesized by the inverse filterbank.

Figure 7:
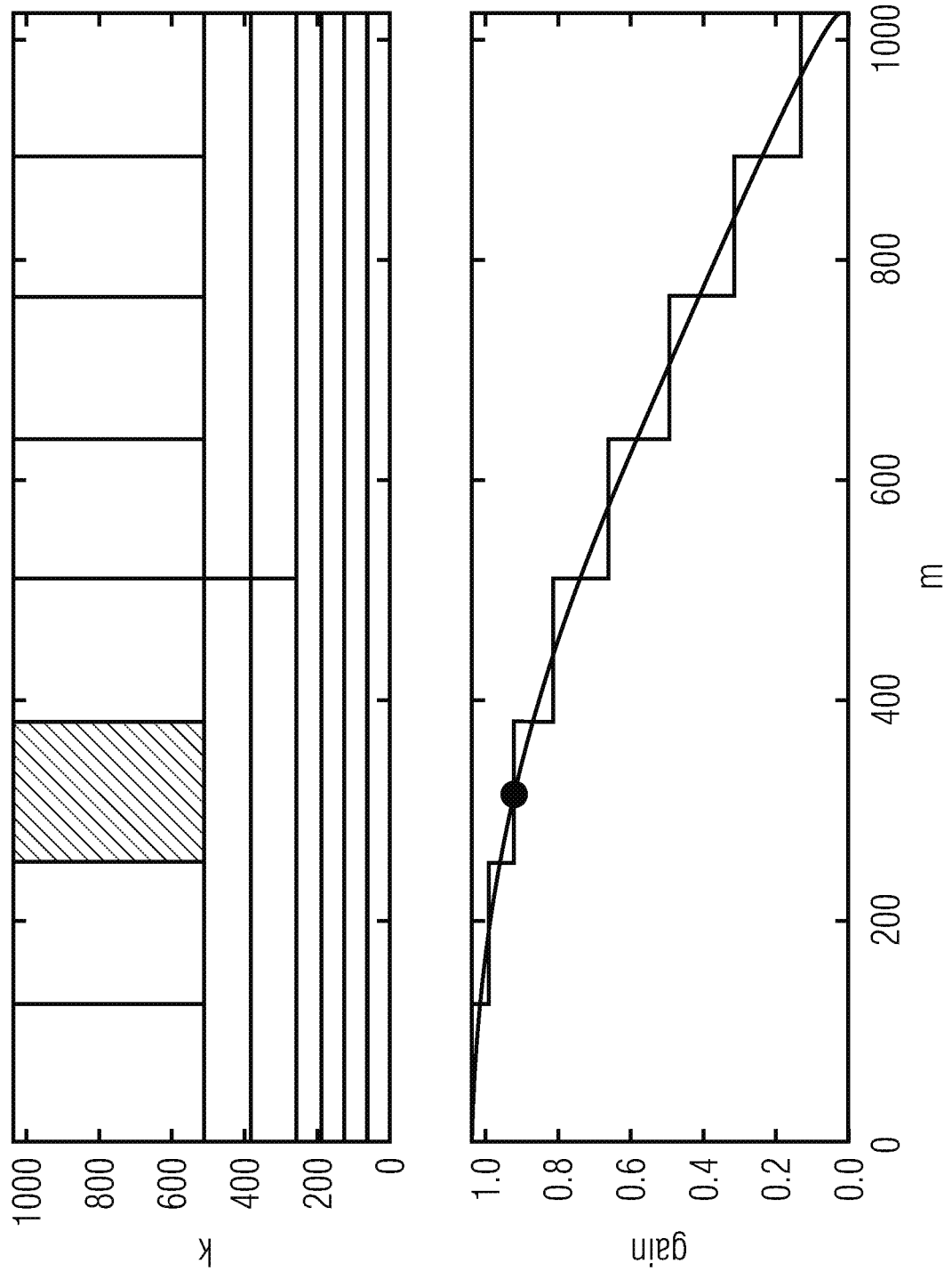
FIG. 7 shows in diagrams an example of subband samples (top graph) and the spread of their samples over time and frequency (below graph)

FIG. 7 shows in diagrams an example of subband samples (top graph) and the spread of their samples over time and frequency (below graph). The annotated sample has wider bandwidth but a shorter time spread than the bottom samples. The analysis windows (bottom graph) have a full resolution of one coefficient per original time sample. The TDAR coefficients thus is approximated (annotated by a dot) for each subband samples' time region (m=256:::384).

Subsequently, (simulation) results are described.

Figure 8:
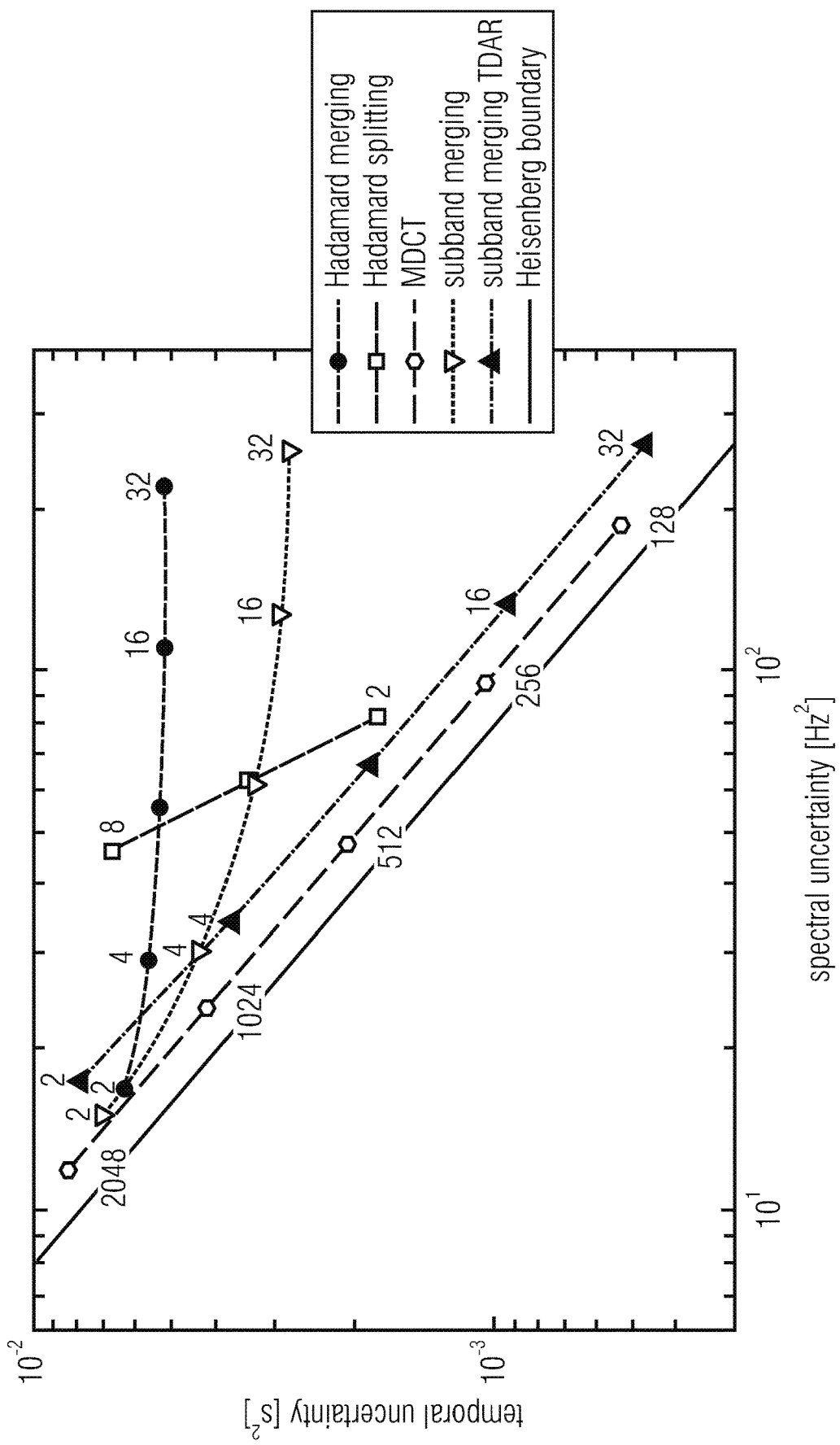
FIG. 8 shows in a diagram the spectral and temporal uncertainty obtained by several different transforms.

FIG. 8 shows the spectral and temporal uncertainty obtained by several different transforms, as shown in [Frederic Bimbot, Ewen Camberlein, and Pierrick Philippe, "Adaptive filter banks using fixed size mdct and subband merging for audio coding-comparison with the mpeg aac filter banks," in Audio Engineering Society Convention 121, October 2006.].

It can be seen that the Hadamard-matrix based transforms offer severely limited time-frequency tradeoff capabilities. For growing merge sizes, additional temporal resolution come at a disproportionally high cost in spectral uncertainty.

In other words, FIG. 8 shows a comparison of spectral and temporal energy compaction of different transforms. Inline labels denote framelengths for MDCT, split factors for Heisenberg Splitting and merge factors for all others.

Subband Merging with TDAR however has a linear tradeoff between temporal and spectral uncertainty, parallel to a plain uniform MDCT. The product of the two is constant, albeit a little bit higher than plain uniform MDCT. For this analysis a Sine analysis window and a Kaiser Bessel Derived subband merging window showed the most compact results and were thusly chosen.

However using TDAR for a merging factor $N_v=2$ seems to decrease both temporal and spectral compactness. We attribute this to the coefficient calculation scheme introduced in Section II-B being too simplistic and not appropriately approximating values for steep window function slopes. A numeric optimization scheme will be presented in a follow-up publication.

These compactness values were calculated using the center of gravity cog and squared effective length $l_{eff}^2$ of the impulse response x[n], defined as [C. Taswell. "Empirical Tests for Evaluation of Multirate Filter Bank Parameters". pp. 15-16, 2001.]

$$cogx = \frac{\sum_{n=1}^{N} |x[n]|^2 n^2}{\sum_{n=1}^{N} |x[n]|^2} \quad (22)$$

$$l_{eff}^2 x = \frac{\sum_{n=1}^{N} |x[n]|^2 (n - cogx)^2}{\sum_{n=1}^{N} |x[n]|^2} \quad (23)$$

Shown are the average values of all impulse responses of each individual filterbank.

Figure 9:
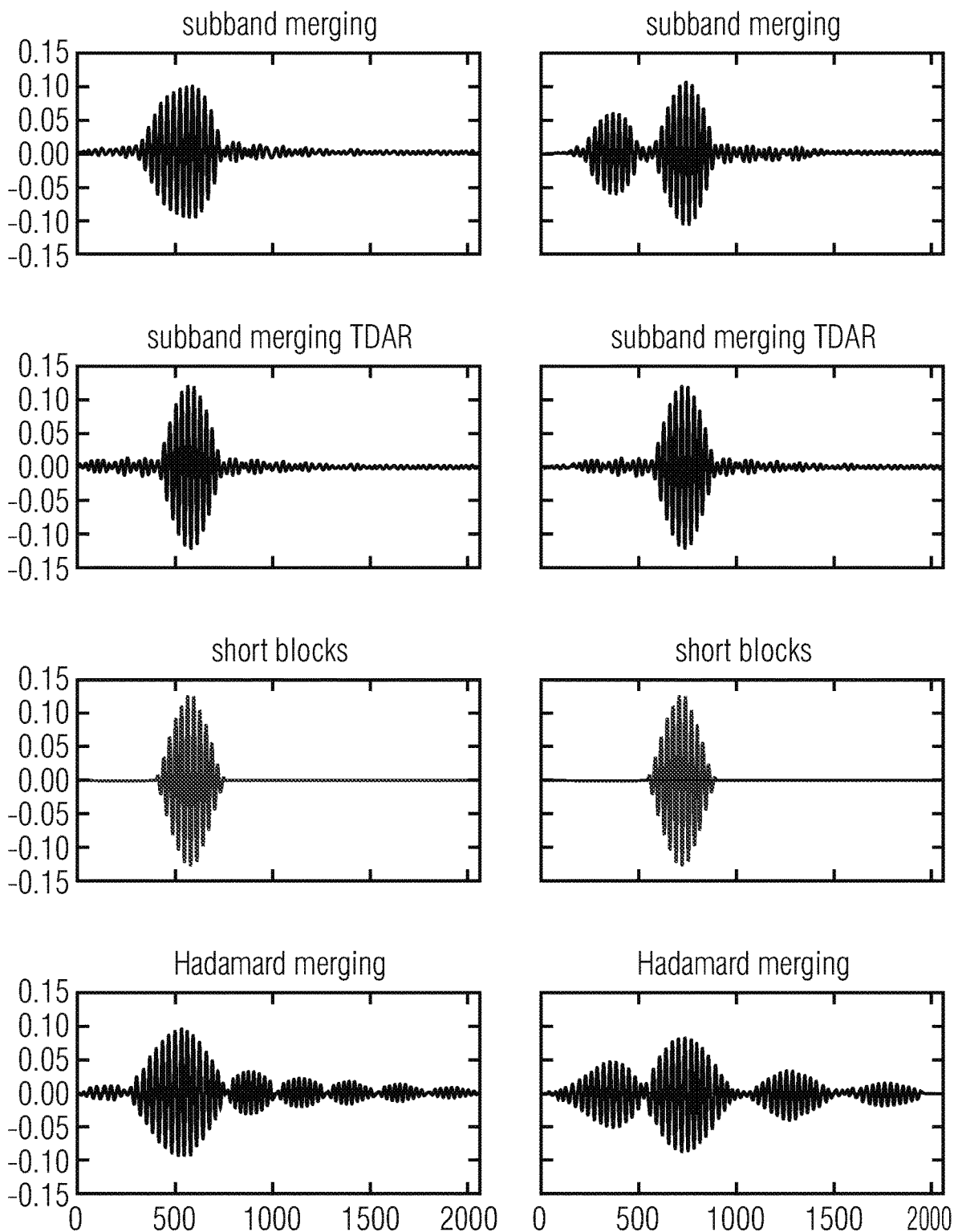
FIG. 9 shows in diagrams shows a comparison of two exemplary impulse responses generated by subband merging with and without TDAR, simple MDCT shortblocks and Hadamard matrix subband merging.

FIG. 9 shows a comparison of two exemplary impulse responses generated by subband merging with and without TDAR, simple MDCT shortblocks and Hadamard matrix subband merging as proposed in [O. A. Niamut and R. Heusdens, "Flexible frequency decompositions for cosine-modulated filter banks," in Acoustics, Speech, and Signal Processing, 2003. Proceedings. (ICASSP '03). 2003 IEEE International Conference on, April 2003, vol. 5, pp. V-449-52 vol. 5.].

The poor temporal compactness of the Hadamard matrix merging transform is clearly visible. Also it can clearly be seen that most of the aliasing artifacts in the subband are significantly reduced by TDAR.

In other words, FIG. 9 shows an exemplary impulse responses of a merged subband filter comprising 8 of 1024 original bins using the method proposed here without TDAR, with TDAR, the method proposed in [O. A. Niamut and R. Heusdens, "Subband merging in cosine-modulated filter banks," Signal Processing Letters, IEEE, vol. 10, no. 4, pp. 111-114, April 2003.] and using a shorter MDCT framelength of 256 samples.

FIG. 10 shows a flowchart of a method 300 for processing an audio signal to obtain a subband representation of the audio signal. The method 300 comprises a step 302 of performing a cascaded lapped critically sampled transform on at least two partially overlapping blocks of samples of the audio signal, to obtain a set of subband samples on the basis of a first block of samples of the audio signal, and to obtain a corresponding set of subband samples on the basis of a second block of samples of the audio signal. Further, the method 300 comprises a step 304 of performing a weighted combination of two corresponding sets of subband samples, one obtained on the basis of the first block of samples of the audio signal and one obtained on the basis on the second block of samples of the audio signal, to obtain an aliasing reduced subband representation of the audio signal.

FIG. 11 shows a flowchart of a method 400 for processing a subband representation of an audio signal to obtain the audio signal. The method 400 comprises a step 402 of performing a weighted (and shifted) combination of two corresponding aliasing reduced subband representations (of different blocks of partially overlapping samples) of the audio signal, to obtain an aliased subband representation, wherein the aliased subband representation is a set of subband samples. Further, the method 400 comprises a step 404 of performing a cascaded inverse lapped critically sampled transform on the set of subband samples, to obtain a set of samples associated with a block of samples of the audio signal.

Figure 12:
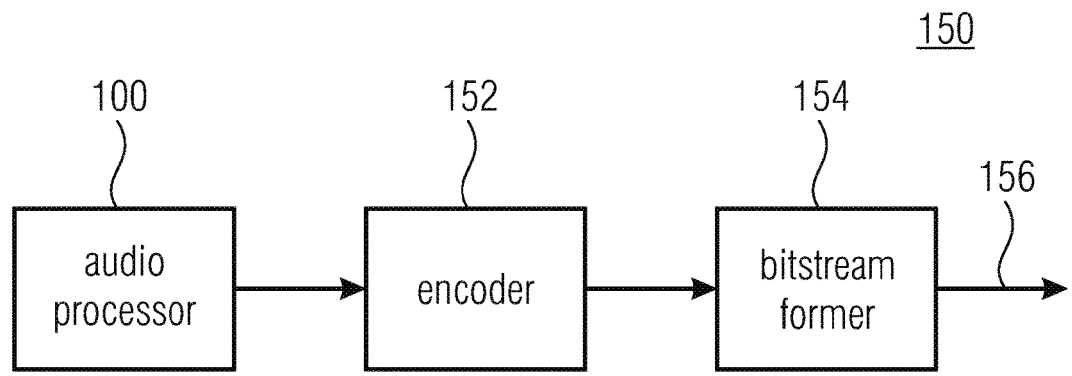
FIG. 12 shows a schematic block diagram of an audio encoder, according to an embodiment.

FIG. 12 shows a schematic block diagram of an audio encoder 150, according to an embodiment. The audio encoder 150 comprises an audio processor (100) as described above, an encoder 152 configured to encode the aliasing reduced subband representation of the audio signal, to obtain an encoded aliasing reduced subband representation of the audio signal, and a bitstream former 154 configured to form a bitstream 156 from the encoded aliasing reduced subband representation of the audio signal.

Figure 13:
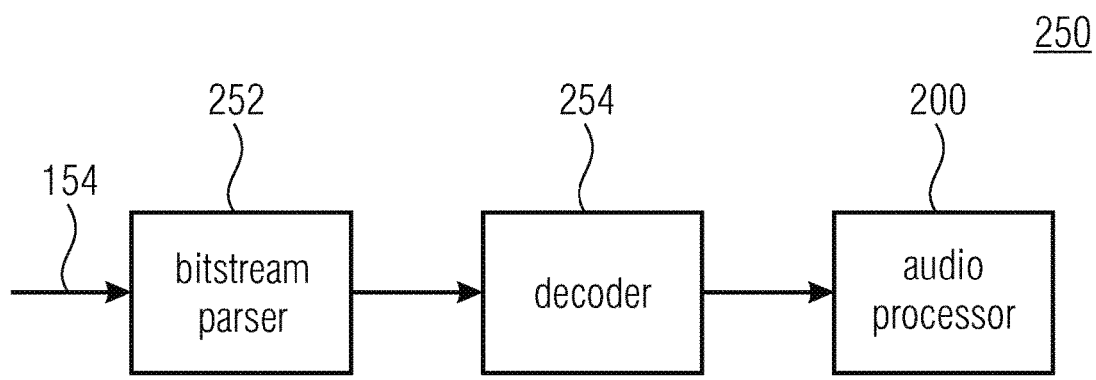
FIG. 13 shows a schematic block diagram of an audio decoder, according to an embodiment.

FIG. 13 shows a schematic block diagram of an audio decoder 250, according to an embodiment. The audio decoder 250 comprises a bitstream parser 252 configured to parse the bitstream 154, to obtain the encoded aliasing reduced subband representation, a decoder 254 configured to decode the encoded aliasing reduced subband representation, to obtain the aliasing reduced subband representation of the audio signal, and an audio processor 200 as described above.

Figure 14:
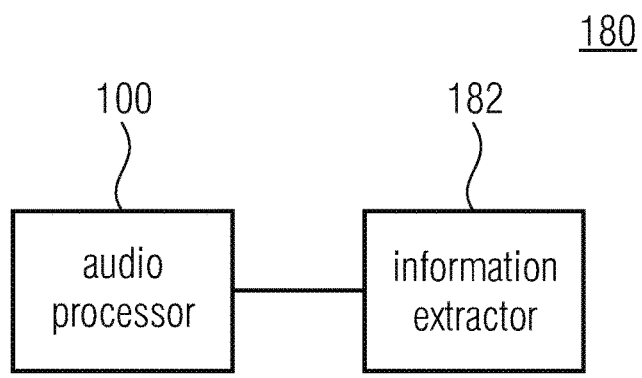
FIG. 14 shows a schematic block diagram of an audio analyzer, according to an embodiment.

FIG. 14 shows a schematic block diagram of an audio analyzer 180, according to an embodiment. The audio analyzer 180 comprises an audio processor 100 as described above, an information extractor 182, configured to analyze the aliasing reduced subband representation, to provide an information describing the audio signal.

Embodiments provide time domain aliasing reduction (TDAR) in subbands of non-uniform orthogonal modified discrete cosine transform (MDCT) filterbanks.

Embodiments add an additional post-processing step to the widely used MDCT transform pipeline, the step itself comprising only another lapped MDCT transform along the frequency axis and time domain aliasing reduction (TDAR) along each subband time axis, allowing to extract arbitrary frequency scales from the MDCT spectrogram with an improved temporal compactness of the impulse response, while introducing no additional redundancy and only one MDCT frame delay.

Figure 15:
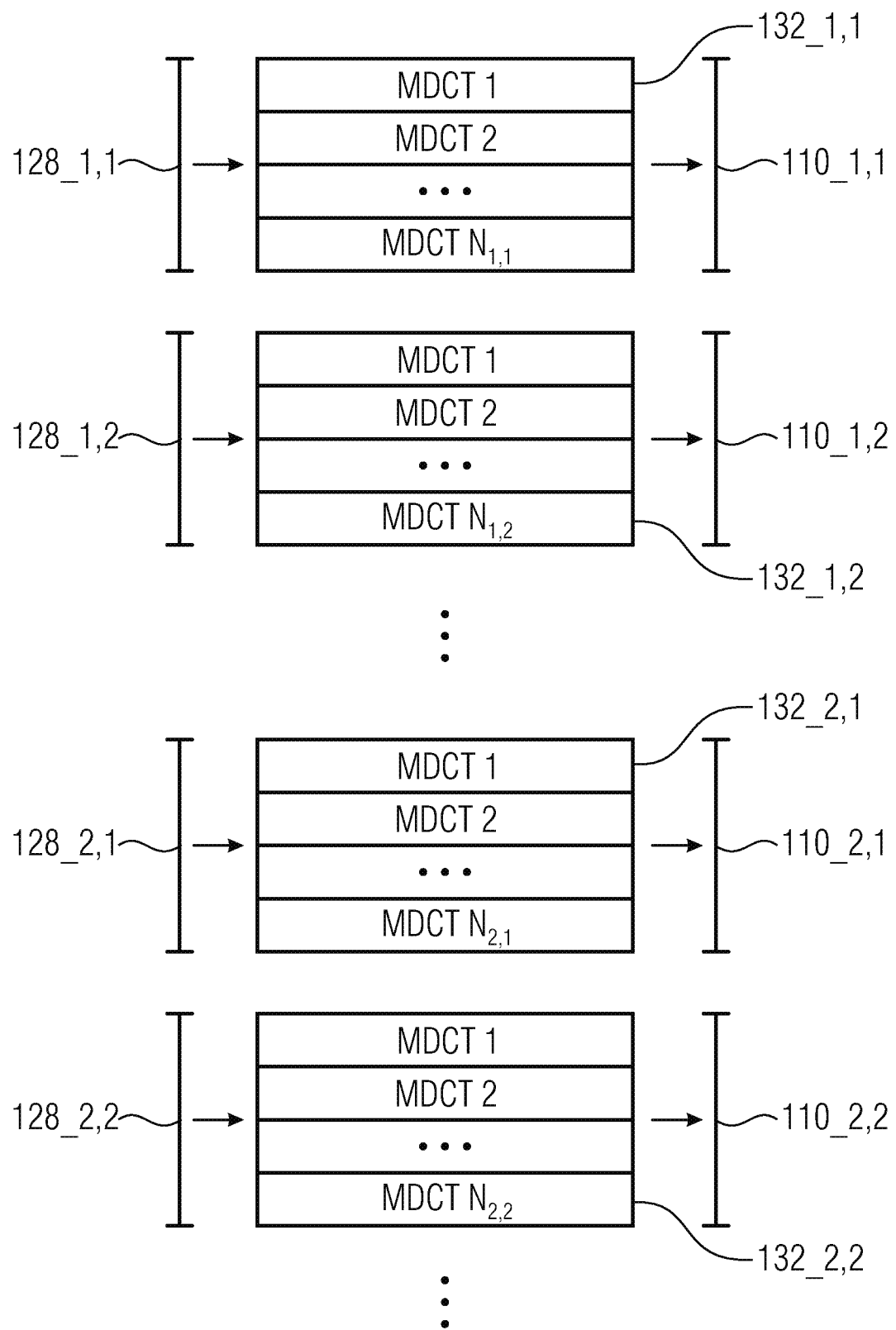
FIG. 15 shows a schematic block diagram of lapped critically sampled transform sub-stages of the second lapped critically sampled transform stage of the audio processor shown in FIGS. 2 and 3, according to an embodiment of the present invention.

2. Perceptual Audio Coding with Adaptive Non-Uniform Time/Frequency Tilings Using Subband Merging and Time Domain Aliasing FIG. 15 shows a schematic block diagram of lapped critically sampled transform sub-stages 132_1,1, 132_1,2, 132_2,1 and 132_2,2 of the second lapped critically sampled transform stage 126 of the audio processor 100 shown in FIGS. 2 and 3, according to an embodiment of the present invention.

Thereby, at least one of the lapped critically sampled transform sub-stages 132_1,1, 132_1,2, 132_2,1 and 132_2,2 can be configured to perform lapped critically sampled transforms having the same framelength (e.g., mergefactor) for the corresponding set 128_1,1, 128_1,2, 128_2,1 and 128_2,2 of bins.

In embodiments, the first lapped critically transform sub-stage 132_1,1 can be configured to perform $N_{1,1}$ lapped critically sampled transforms on $N_{1,1}$ sub-sets of equal length of a first set 128_1,1 of bins obtained on the basis of the segmented set 124_1 of bins corresponding to the first block 108_1 of samples, wherein the $N_{1,1}$ lapped critically sampled transforms comprise the same framelength (e.g., mergefactor), wherein $N_{1,1}$ is a natural number greater than or equal to two.

For example, assuming that the first set 128_1,1 of bins comprises 128 bins (or coefficients), the first lapped critically transform sub-stage 132_1,1 can be configured to perform, for example, $N_{1,1}=2$ lapped critically sampled transforms on $N_{1,1}=2$ sub-sets of 64 bins each (i.e., 128 bins divided by $N_{1,1}$), wherein the $N_{1,1}=2$ lapped critically sampled transforms comprise the same framelength (e.g., mergefactor), for example, of 64. Naturally, the first lapped critically transform sub-stage 132_1,1 also can be configured to perform, for example, $N_{1,1}=4$ (or 8) lapped critically sampled transforms on $N_{1,1}=4$ (or 8) sub-sets of 32 (or 16) bins each (i.e., 128 bins divided by $N_{1,1}$), wherein the $N_{1,1}=4$ (or 8) lapped critically sampled transforms comprise the same framelength (e.g., mergefactor), for example, of 32 (or 16).

In embodiments, the second lapped critically transform sub-stage 132_1,2 can be configured to perform $N_{1,2}$ lapped critically sampled transforms on $N_{1,2}$ sub-sets of equal length of a second set 128_1,2 of bins obtained on the basis of the segmented set 124_1 of bins corresponding to the first block 108_1 of samples, wherein the $N_{1,2}$ lapped critically sampled transforms comprise the same framelength (e.g., mergefactor), wherein $N_{1,2}$ is a natural number greater than or equal to two.

For example, assuming that the second set 128_1,2 of bins comprises 128 bins (or coefficients), the second lapped critically transform sub-stage 132_1,2 can be configured to perform, for example, $N_{1,2}=2$ lapped critically sampled transforms on $N_{1,2}=2$ sub-sets of 64 bins each (i.e., 128 bins divided by $N_{1,1}$), wherein the $N_{1,2}=2$ lapped critically sampled transforms comprise the same framelength (e.g., mergefactor), for example, of 64. Naturally, the second lapped critically transform sub-stage 132_1,2 also can be configured to perform, for example, $N_{1,2}=4$ (or 8) lapped critically sampled transforms on $N_{1,2}=4$ (or 8) sub-sets of 32 (or 16) bins each (i.e., 128 bins divided by $N_{1,2}$), wherein the $N_{1,2}=4$ (or 8) lapped critically sampled transforms comprise the same framelength (e.g., mergefactor), for example, of 32 (or 16).

In embodiments, the third lapped critically transform sub-stage 132_2,1 can be configured to perform $N_{2,1}$ lapped critically sampled transforms on $N_{2,1}$ sub-sets of equal length of a third set 128_2,1 of bins obtained on the basis of the segmented set 124_2 of bins corresponding to the second block 108_2 of samples, wherein the $N_{2,1}$ lapped critically sampled transforms comprise the same framelength (e.g., mergefactor), wherein $N_{2,1}$ is a natural number greater than or equal to two.

For example, assuming that the third set 128_2,1 of bins comprises 128 bins (or coefficients), the third lapped critically transform sub-stage 132_2,1 can be configured to perform, for example, $N_{2,1}=2$ lapped critically sampled transforms on $N_{2,1}=2$ sub-sets of 64 bins each (i.e., 128 bins divided by $N_{1,1}$), wherein the $N_{1,1}=2$ lapped critically sampled transforms comprise the same framelength (e.g., mergefactor), for example, of 64. Naturally, the third lapped critically transform sub-stage 132_2,1 also can be configured to perform, for example, $N_{2,1}=4$ (or 8) lapped critically sampled transforms on $N_{2,1}=4$ (or 8) sub-sets of 32 (or 16) bins each (i.e., 128 bins divided by $N_{1,1}$), wherein the $N_{2,1}=4$ (or 8) lapped critically sampled transforms comprise the same framelength (e.g., mergefactor), for example, of 32 (or 16). In embodiments, the fourth lapped critically transform sub-stage 132_2,2 can be configured to perform $N_{2,2}$ lapped critically sampled transforms on $N_{2,2}$ sub-sets of equal length of a fourth set 128_2.2 of bins obtained on the basis of the segmented set 124_2 of bins corresponding to the second block 108_2 of bins, wherein the $N_{2,2}$ lapped critically sampled transforms comprise the same framelength (e.g., mergefactor), wherein $N_{2,2}$ is a natural number greater than or equal to two.

For example, assuming that the fourth set 128_2,2 of subband bins comprises 128 bins (or coefficients), the fourth lapped critically transform sub-stage 132_2,2 can be configured to perform, for example, $N_{2,2}=2$ lapped critically sampled transforms on $N_{2,2}=2$ sub-sets of 64 bins each (i.e., 128 bins divided by $N_{2,2}$), wherein the $N_{2,2}=2$ lapped critically sampled transforms comprise the same framelength (e.g., mergefactor), for example, of 64. Naturally, the fourth lapped critically transform sub-stage 132_2,2 also can be configured to perform, for example, $N_{2,2}=4$ (or 8) lapped critically sampled transforms on $N_{2,2}=4$ (or 8) sub-sets of 32 (or 16) bins each (i.e., 128 bins divided by $N_{2,2}$), wherein the $N_{2,2}=4$ (or 8) lapped critically sampled transforms comprise the same framelength (e.g., mergefactor), for example, of 32 (or 16).

In embodiments, the first set 128_1,1 of bins and the second set 128_1,2 of bins can comprise the same or different length (i.e., number of bins).

In embodiments, $N_{1,1}$ and $N_{1,2}$ can be the same or different natural numbers.

In embodiments, the third set 128_2,1 of bins and the fourth set 128_2,2 or bins can comprise the same or different length (i.e., number of bins).

In embodiments, $N_{2,1}$ and $N_{2,2}$ can be the same or different natural numbers.

In embodiments, if TDAR is enabled, the first set 128_1,1 of bins and the third set 128_2,1 of bins can comprise the same length (i.e., the same number of bins). Also, $N_{1,1}$ and $N_{2,1}$ can be the same natural number. Similarly, also the second set 128_1,2 of bins and the fourth set 128_2,2 of bins can comprise the same length (i.e., the same number of bins). Also, $N_{2,1}$ and $N_{2,2}$ can be the same natural number.

In embodiments, if TDAR is disabled, the first set 128_1,1 of bins and the third set 128_2,1 of bins also can comprise different lengths (i.e., different numbers of bins) and also $N_{1,1}$ and $N_{2,1}$ can be different natural numbers. Similarly, the second set 128_1,2 of bins and the fourth set 128_2,2 of bins also can comprise different lengths (i.e., different numbers of bins) and also $N_{2,1}$ and $N_{2,2}$ can be different natural numbers.

Figure 16:
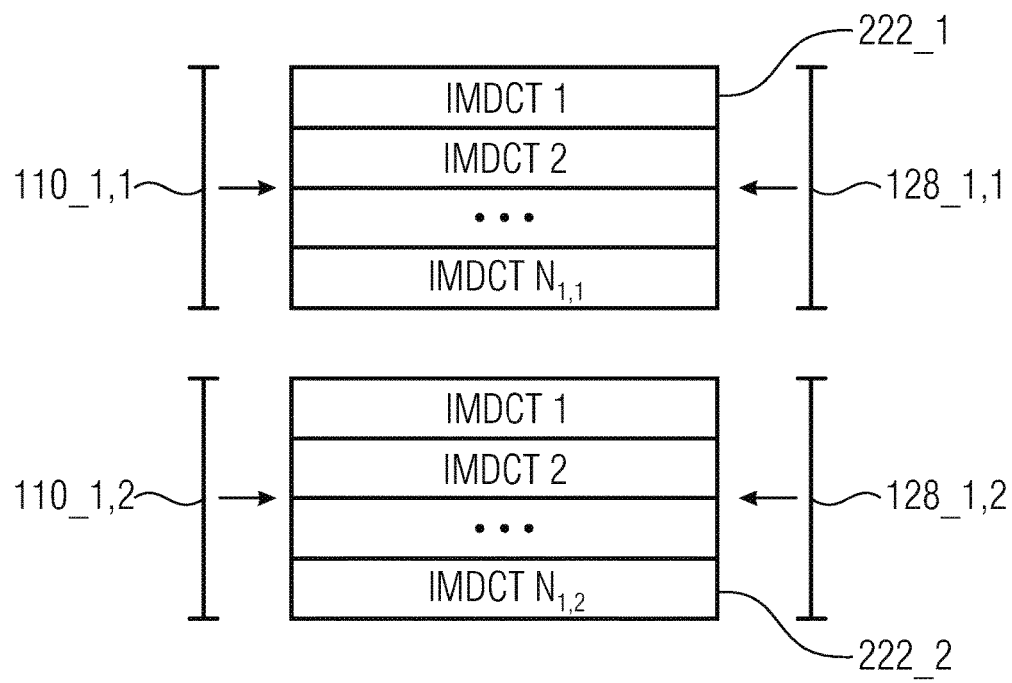
FIG. 16 shows a schematic block diagram of inverse lapped critically sampled transform sub-stages of the first inverse lapped critically sampled transform stage of the audio processor shown in FIGS. 5 and 6, according to an embodiment of the present invention.

FIG. 16 shows a schematic block diagram of inverse lapped critically sampled transform sub-stages 222_1 and 2222 of the first inverse lapped critically sampled transform stage 208 of the audio processor 200 shown in FIGS. 5 and 6, according to an embodiment of the present invention.

Thereby, at least one of the inverse lapped critically sampled transform sub-stages 222_1 and 222_2 can be configured to perform inverse lapped critically sampled transforms having the same framelength (e.g., mergefactor) on the corresponding set 110_1,1 and 110_1,2 of subband samples, to obtain the corresponding set 128_1,1 and 128_1,2 of bins.

In embodiments, the first inverse lapped critically transform sub-stage 222_1 can be configured to perform $N_{1,1}$ inverse lapped critically sampled transforms on $N_{1,1}$ sub-sets of equal length of a first set 110_1 of subband samples, wherein the $N_{1,1}$ lapped critically sampled transforms comprise the same framelength (e.g., mergefactor) wherein $N_{1,1}$ is a natural number greater than or equal to two.

In embodiments, the second inverse lapped critically transform sub-stage 222_2 can be configured to perform $N_{1,2}$ inverse lapped critically sampled transforms on $N_{1,2}$ sub-sets of equal length of a second set 110_1 of subband samples, wherein the $N_{1,2}$ lapped critically sampled transforms comprise the same framelength (e.g., mergefactor) wherein $N_{1,2}$ is a natural number greater than or equal to two.

Subsequently, detailed embodiments of the non-uniform filterbank are described. Further, the perceptual quality of such a non-uniform filterbank in an audio coder scenario is evaluated and compared to the performance of a uniform filterbank with window switching as used in current coders, such as Advanced Audio Coding (AAC) [2].

2.1 Coding System

The evaluation system models a simple perceptual coder, with an analysis filterbank, a psychoacoustic model (4), quantizer, perceptual entropy estimation [5], and a synthesis filterbank. In the two competing systems, the filterbank was either a uniform MDCT with window-switching [6] (WS), or a nonuniform MDCT with subband-merging and TDAR [1] (SM).

The relevant filterbank-parameters—window-switching boundaries for the uniform MDCT, or mergefactors and TDAR boundaries for the non-uniform MDCT—were adaptively and optimally chosen to minimize the overall remaining entropy.

No additional post-processing steps or coding-tools may be used.

2.1.1 Filterbank Parameters

The window switching filterbank may use an MDCT with the usual AAC framelengths: long frames of 1024 samples or 8 short frames of 128 samples and appropriate transition windows between them. The cosine window can be used. The subband merging filterbank 120 may use an initial MDCT of framelength, for example, 1024, and then divide the spectrum into 8 mergefactor bands (e.g., 128_1,1, 128_1, 2, etc.) of 128 coefficients each. Each mergefactorband may then be merged with an MDCT for framelength $N \in (1,2,4,8,16,32)$, called a mergefactor. As per design of the system, during analysis the optimal choice in mergefactor was not known yet, and each mergefactor-band does not know the mergefactor of any of its neighbors. Thus, the windows at the mergefactor-band edges can be chosen to always be asymmetric, and steep enough to accommodate the steepest possible neighbor mergefactor, see FIG. 17.

Figure 17:
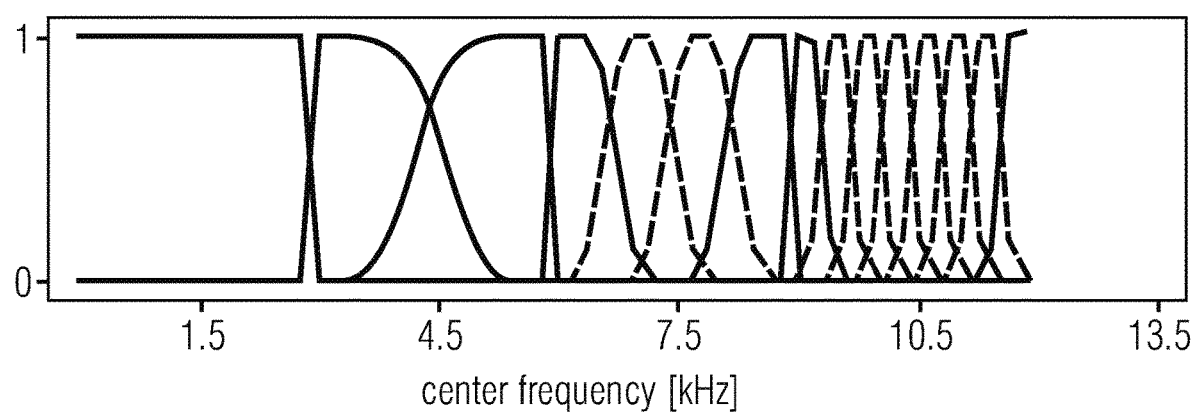
FIG. 17 shows in a diagram window functions used for segmenting a set of bins, to obtain sets of bins, according to an embodiment of the present invention.

In detail, FIG. 17 shows in a diagram window functions used for segmenting a set of bins (124_1), to obtain sets (or segments) (128_1,1, 128_1,2) of bins. In other words, FIG. 16 shows example window choices in four mergefactor-bands. Steep mergefactor-band edge windows are highlighted in black.

This design choice limits the overall flexibility of the filterbank and introduces less-than-ideal temporal ripples for these asymmetric windows [1], but offers a way to efficiently and independently optimize the mergefactor for each mergefactor-band.

The cosine window may be used as the transform window, and a Kaiser-Bessel-derived window with an arbitrarily chosen $\beta=5.1$ can be chosen as the merge window.

Finally, quantization stepsizes can be controlled using a real valued distortion parameter q, which multiplicatively lowers or raises the estimated masking threshold from the perceptual model by a constant factor q. After quantization, the perceptual entropy estimator calculates a theoretical bitrate r, which naturally is dependent on q. For q=1.0, the psychoacoustic model predicts transparent coding without any audible artifacts, for larger values q>1.0, quantization stepsize increases, the bitrate r drops, and the perceived quality of the process is expected to deteriorate.

2.1.2 Parameter Optimization

To perform optimal parameter tuning, each signal was transformed and quantized using all possible parameter combinations, and the perceptual entropy of each frame for each parameter was estimated. Among all of the output coefficients, an optimal combination of parameters that minimizes the overall perceptual entropy was computed, and the output signal was then synthesized using these parameters.

To find optimal filterbank parameters, each mergefactor-band in each frame (a merge-tile of 128 coefficients) was quantized and its entropy was calculated. The graph of all parameters of all merge-tiles in one mergefactor-band then forms a trellis, where the weights of each transition probability is set to equal to the entropy of the following mergetile [7].

As previously noted, not all parameter combinations and transitions will allow perfect reconstruction during synthesis, e.g. when switching from long to short frames, an asymmetric start window is used inbetween. Similar rules apply for the use of TDAR in the non-uniform filterbank [1]. To prevent these illegal parameter transitions, the transition probabilities in the trellis were multiplied with a mask that encoded all legal and illegal transitions, i.e. 1 for legal and 1 for illegal transitions.

Afterwards, a minimum-weight path through the trellis was computed using dynamic programming, resulting in an overall optimal parameter path in each individual mergefactor band that also guarantees perfect reconstruction.

This approach uses multiple encoding passes, a very large lookahead, and is thus not suitable for an actual on-line coder, however it guarantees that both methods performed at their maximum possible efficiency at all times. For online encoding, methods for decoding such trellis diagrams under latency constraints exist [8].

Both system assumed simple and uncompressed transmission of necessary side information: For Window Switching, 1 bit was used for each frame to signal long- and short blocks ($\lceil Log_2(2) \rceil = 1$). For Subband Merging, 29 bits were used per frame to signal mergefactor and TDAR flag (8 mergefactor-bands with 6 mergefactors and 2 TDAR values each, $\lceil \log_2 ((6 \times 2)^8) \rceil = 29$. Scalefactors or masking thresholds were known at the decoder side.

2.2. General Observations

Just running the encoding/decoding process, one can observe the following properties:

In the highest two to three mergefactor-bands, ranging from 15 kHz-24 kHz, the coder almost always chose a mergefactor of 1, disabling merging. In the midsection, mergefactor-bands 2-5 or frequency range between 3 kHz-15 kHz, the coder mainly chose either mergefactor 1 or 32. In the lower mergefactor-band, ranging from 0 kHz-3 kHz, the coder mostly chose merge factors 1 and 2. Mergefactors 4, 8 and 16 were rarely chosen. See FIG. 18.

Figure 18:
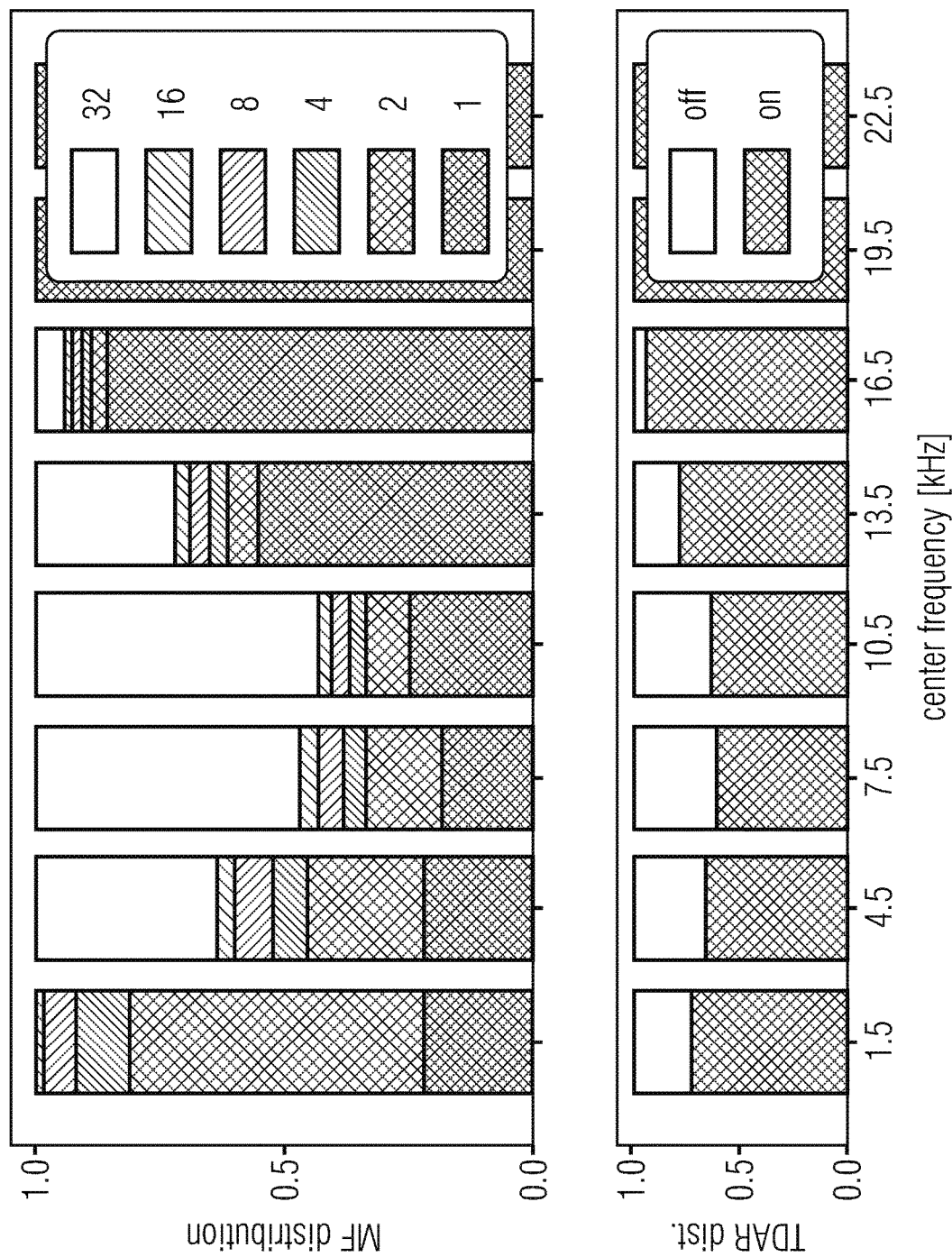
FIG. 18 shows in diagrams distributions of mergefactor (MF) and time domain aliasing reduction (TDAR) choices made by the coder.

In detail, FIG. 18 shows in diagrams distributions of mergefactor (MF) and time domain aliasing reduction (TDAR) choices made by the coder.

This observation agrees with basic assumptions about the auditory system: due to the high frequencies having a very high threshold in quiet, effectively almost everything is quantized to zero, making the choice in mergefactor irrelevant. In the mid-range frequencies the auditory system has a high temporal resolution, while in the lower frequencies the human ear has a higher frequency resolution.

Secondly, one notices that for any chosen distortion parameter q, the corresponding bitrate of the subband merging filterbank is below that of the window switching filterbank. On average, the non-uniform system entailed 5-13% fewer bits per sample to code the signals, see FIG. 19.

Figure 19:
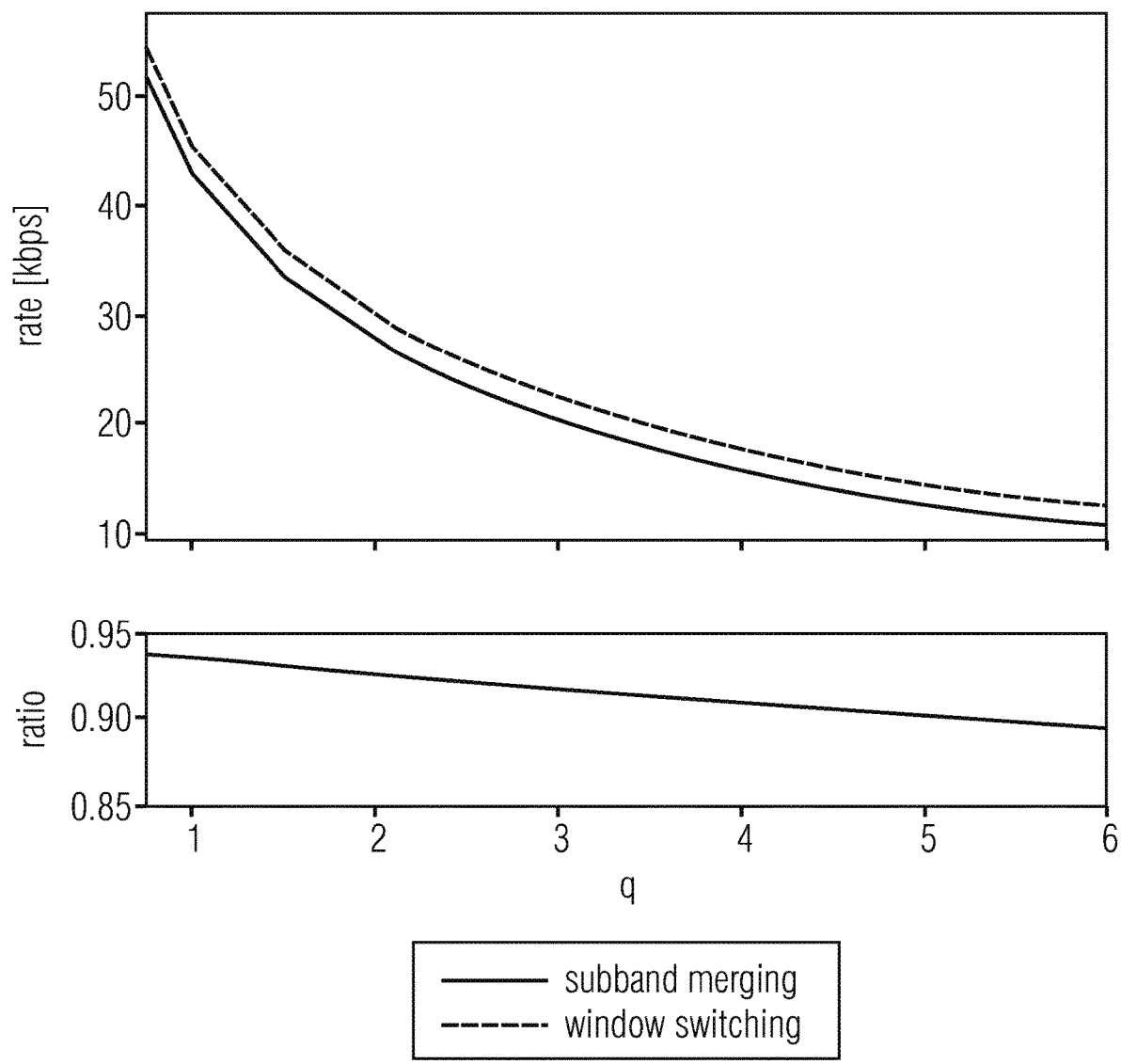
FIG. 19 shows in diagrams average bitrates of the two systems for different distortion parameters q over 39 test items.

In detail, FIG. 19 shows in diagrams average bitrates of the two systems for different distortion parameters q over 39 test items.

2.3 Listening Test Setup

Three different quality settings at different quantizer stepsize coefficients and thus average bitrates were considered: Transparent (HQ), slightly impaired (MQ) and moderately impaired (LQ), see Table 1 in FIG. 20.

In detail, Table 1 in FIG. 20 lists quality settings and their distortion parameter q and resulting average bitrate.

As per the design of the perceptual model, for HQ no audible artifacts were expected [4]. And indeed, during small-scale ABC/HR (ITU-R BS.1116-3) [9] listening tests, expert listeners could not discern significant differences between the either method and the reference signal. As conducting such a listening test is unlikely to reveal any meaningful results, it was skipped in favor of the two remaining quality settings MO and LO.

For MQ and LQ, the distortion parameter q of the window switching filterbank system was chosen so that its the output bitrate matched that of the subband merging filterbank, meaning the distortion parameter q for the subband merging filterbank was lower than for the window switching filterbank. It follows that with the non-uniform filterbank a higher perceived quality can be achieved, while allowing the same bitrate as the window switching filterbank. To test this, a listening test using the multi-stimulus test with hidden reference and anchor method (MUSHRA, ITU-R BS.1534-3) [10] was conducted.

2.4 Test Signal Corpus

The test signals for this evaluation were taken from a test set commonly used for audio coder development and tuning. It contained male and female speech, and several music recordings containing both harmonic and percussive sounds. All conditions were loudness normalized using ITU-R BS.1770-4 [11]. See Table 2 in FIG. 21. In detail. Table 2 in FIG. 21 lists the different test items.

2.5 Listening Test Results

A total of N=16 expert listeners took part in the test.

First, a Shapiro-Wilk test was used to test the pairwise differences in MUSHRA scores between the two methods for normality. For LQ and MQ, the differences were significantly non-normal, see Table 3 in FIG. 22 and FIG. 4 in FIG. 23.

Figures 22, 23:
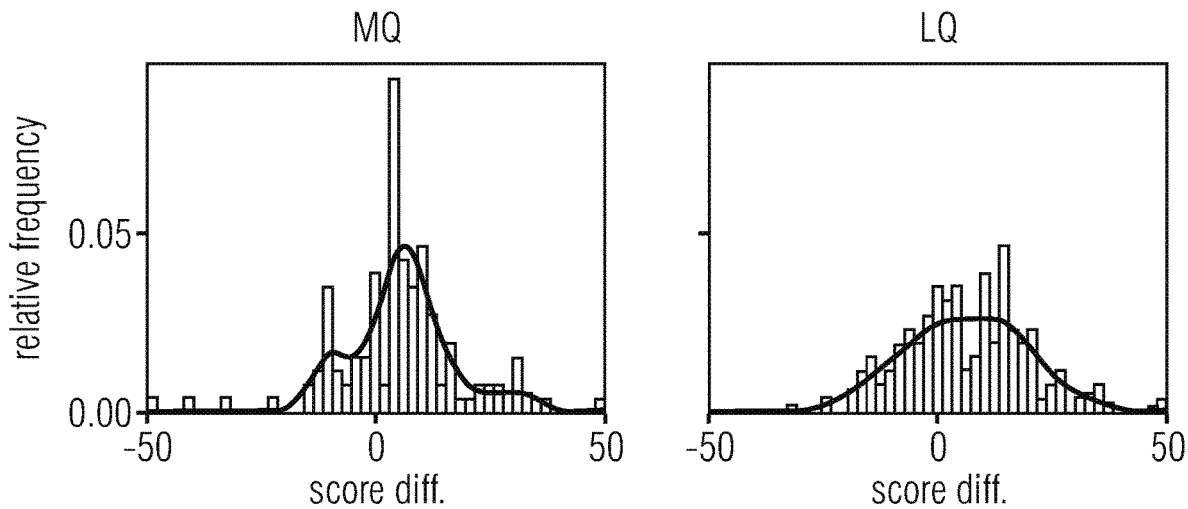
FIG. 22 lists in a table results of Shapiro-Wilk test for normality for the pairwise MUSHRA scores differences between the window switching filterbank (WS) and subband merging filterbank (SM) at slightly impaired (MQ) and moderately impaired (LQ) quality settings.
FIG. 23 shows in diagrams distributions and kernel density estimates of MUSHRA score differences between the window switching filterbank (WS) and Subband Merging filterbank (SM) at slightly impaired (MQ) and moderately impaired (LO) quality settings.

In detail, Table 3 in FIG. 22 lists results of Shapiro-Wilk test for normality for the pairwise MUSHRA scores differences between the window switching filterbank (WS) and subband merging filterbank (SM) at slightly impaired (MQ) and moderately impaired (LQ) quality settings. W denotes W-statistic, p denotes p-value.

Therefore, an on-parametric Wilcoxon signed-rank test was used instead of the parametric paired t-test on all conditions. A summary of all tests can be seen in Table 4 in FIG. 24.

Figures 24, 25:
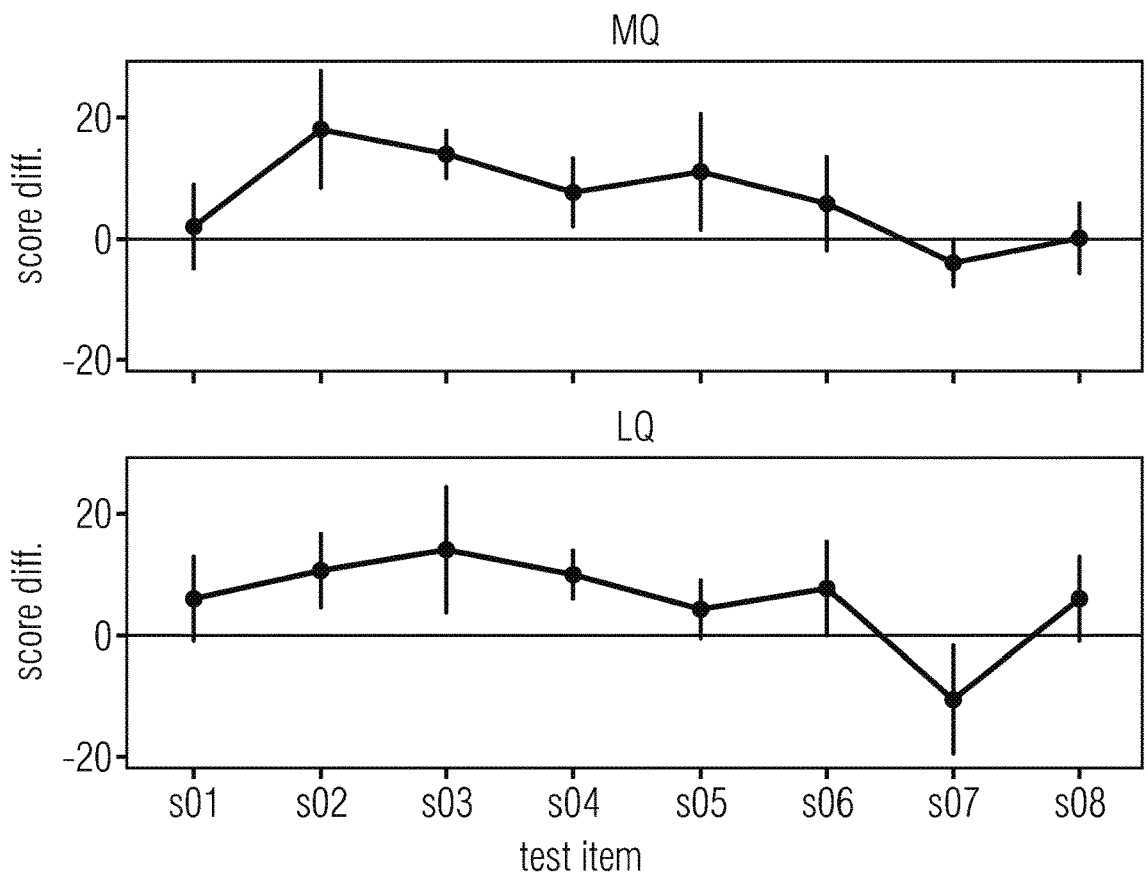
FIG. 24 lists mean, standard deviation (SD), and Wilcoxon signed-rank test results for the MUSHRA scores comparing the window switching filterbank (WS) and subband merging filterbank (SM) at slightly impaired (MQ) and moderately impaired (LQ) quality settings.
FIG. 25 shows in diagrams mean and 95% confidence intervals of MUSHRA score differences for individual items, window switching filterbank and subband merging filterbank at slightly impaired (MQ) and moderately impaired (LQ) quality settings.

In detail, Table 4 in FIG. 24 lists mean, standard deviation (SD), and Wilcoxon signed-rank test results for the MUSHRA scores comparing the window switching filterbank (WS) and subband merging filterbank (SM) at slightly impaired (MO) and moderately impaired (LQ) quality settings. W denote sW-statistic, p denotes p-value.

A Wilcoxon signed-rank test was conducted to compare the perceptual quality of the two systems at MQ. There was a significant difference in the MUSHRA scores for the window switching filterbank and the subband merging filterbank, p=0.000.

Secondly, a Wilcoxon signed-rank test was conducted to compare the perceptual quality of the two systems at quality setting LQ. There was a significant difference in the MUSHRA scores for the window switching filterbank and the subband merging filterbank, p=0.000.

FIG. 25 shows in diagrams mean and 95% confidence intervals of MUSHRA score differences for individual items, window switching filterbank and subband merging filterbank at slightly impaired (MQ) and moderately impaired (LQ) quality settings. Positive values favor subband merging over window switching.

2.6 Further Embodiments

Embodiments provide a method of using a non-uniform orthogonal filterbank based on MDCT analysis/synthesis and TDAR in a simple audio coder. Above, its coding efficiency was compared to a uniform window switching MDCT filterbank. On average the non-uniform entailed 5-13% fewer bits per sample to code the test signals. This additional coding efficiency can be used to improve the perceived quality of the coder at the same output bitrate.

In the above described test, the improved perceived quality of 6 to 7 MUSHRA points was ascertained using a MUSHRA listening test and a subsequent statistical analysis. The difference in perceived quality was found to be statistically significant.

FIG. 26 shows a flowchart of a method 500 for processing an audio signal to obtain a subband representation of the audio signal, according to an embodiment of the present invention. The method 500 comprises a step 502 of performing a cascaded lapped critically sampled transform on at least two partially overlapping blocks of samples of the audio signal, to obtain a set of subband samples on the basis of a first block of samples of the audio signal, and to obtain a corresponding set of subband samples on the basis of a second block of samples of the audio signal. The method 500 further comprises a step 504 of performing a weighted combination of two corresponding sets of subband samples, one obtained on the basis of the first block of samples of the audio signal and one obtained on the basis on the second block of samples of the audio signal, to obtain an aliasing reduced subband representation of the audio signal; wherein performing a cascaded lapped critically sampled transform comprises segmenting a set of bins obtained on the basis of the first block of samples using at least two window functions, and to obtain at least two segmented sets of bins based on the segmented set of bins corresponding to the first block of samples; wherein performing a cascaded lapped critically sampled transform comprises segmenting a set of bins obtained on the basis of the second block of samples using the at least two window functions, and to obtain at least two sets of bins based on the segmented set of bins corresponding to the second block of samples; and wherein the sets of bins are processed using a second lapped critically sampled transform of the cascaded lapped critically sampled transform, wherein the second lapped critically sampled transform comprises performing lapped critically sampled transforms having the same framelength for at least one set of bins.

FIG. 27 shows a flowchart of a method 600 for method for processing a subband representation of an audio signal to obtain the audio signal, according to an embodiment of the present invention. The method 600 comprises a step 602 of performing a weighted combination of two corresponding aliasing reduced subband representations of the audio signal, to obtain an aliased subband representation, wherein the aliased subband representation is a set of subband samples. Further, the method 600 comprises a step 604 of performing a cascaded inverse lapped critically sampled transform on the set of subband samples, to obtain a set of samples associated with a block of samples of the audio signal, wherein performing the cascaded inverse lapped critically sampled transform comprises performing a first inverse lapped critically sampled transform on the set of subband samples, to obtain a set of bins associated with a given subband of the audio signal, wherein performing the first inverse lapped critically sampled transform comprises performing inverse lapped critically sampled transforms having the same framelength for the set of subband samples.

Subsequently, further embodiments are described. Thereby, the below embodiments can be combined with the above embodiments.

Embodiment 1: An audio processor (100) for processing an audio signal (102) to obtain a subband representation of the audio signal (102), the audio processor (100) comprising: a cascaded lapped critically sampled transform stage (104) configured to perform a cascaded lapped critically sampled transform on at least two partially overlapping blocks (108_1;108_2) of samples of the audio signal (102), to obtain a set (110_1,1) of subband samples on the basis of a first block (108_1) of samples of the audio signal (102), and to obtain a corresponding set (110_2,1) of subband samples on the basis of a second block (108_2) of samples of the audio signal (102); and a time domain aliasing reduction stage (106) configured to perform a weighted combination of two corresponding sets (110_1,1;110_1,2) of subband samples, one obtained on the basis of the first block (108_1) of samples of the audio signal (102) and one obtained on the basis on the second block (108_2) of samples of the audio signal, to obtain an aliasing reduced subband representation (112_1) of the audio signal (102).

Embodiment 2: The audio processor (100) according to embodiment 1, wherein the cascaded lapped critically sampled transform stage (104) comprises: a first lapped critically sampled transform stage (120) configured to perform lapped critically sampled transforms on a first block (108_1) of samples and a second block (108_2) of samples of the at least two partially overlapping blocks (108_1; 108_2) of samples of the audio signal (102), to obtain a first set (124_1) of bins for the first block (108_1) of samples and a second set (124_2) of bins for the second block (108_2) of samples.

Embodiment 3: The audio processor (100) according to embodiment 2, wherein the cascaded lapped critically sampled transform stage (104) further comprises: a second lapped critically sampled transform stage (126) configured to perform a lapped critically sampled transform on a segment (128_1,1) of the first set (124_1) of bins and to perform a lapped critically sampled transform on a segment (128_2,1) of the second set (124_2) of bins, each segment being associated with a subband of the audio signal (102), to obtain a set (110_1,1) of subband samples for the first set of bins and a set (110_2,1) of subband samples for the second set of bins.

Embodiment 4: The audio processor (100) according to embodiment 3, wherein a first set (110_1,1) of subband samples is a result of a first lapped critically sampled transform (132_1,1) on the basis of the first segment (128_1, 1) of the first set (124_1) of bins, wherein a second set (110_1,2) of subband samples is a result of a second lapped critically sampled transform (132_1,2) on the basis of the second segment (128_1,2) of the first set (124_1) of bins, wherein a third set (110_2,1) of subband samples is a result of a third lapped critically sampled transform (132_2,1) on the basis of the first segment (128_2,1) of the second set (128_2,1) of bins, wherein a fourth set (110_2,2) of subband samples is a result of a fourth lapped critically sampled transform (132_2,2) on the basis of the second segment (128_2,2) of the second set (128_2,1) of bins; and wherein the time domain aliasing reduction stage (106) is configured to perform a weighted combination of the first set (110_1,1) of subband samples and the third set (110_2,1) of subband samples, to obtain a first aliasing reduced subband representation (112_1) of the audio signal, wherein the time domain aliasing reduction stage (106) is configured to perform a weighted combination of the second set (110_1,2) of subband samples and the fourth set (110_2,2) of subband samples, to obtain a second aliasing reduced subband representation (112_2) of the audio signal.

Embodiment 5: The audio processor (100) according to one of the embodiments 1 to 4, wherein the cascaded lapped critically sampled transform stage (104) is configured to segment a set (124_1) of bins obtained on the basis of the first block (108_1) of samples using at least two window functions, and to obtain at least two segmented sets (128_1,1;128_1,2) of subband samples based on the segmented set of bins corresponding to the first block (108_1) of samples; wherein the cascaded lapped critically sampled transform stage (104) is configured to segment a set (124_2) of bins obtained on the basis of the second block (108_2) of samples using the at least two window functions, and to obtain at least two segmented sets (128_2,1;128_2,2) of subband samples based on the segmented set of bins corresponding to the second block (108_2) of samples; and wherein the at least two window functions comprise different window width.

Embodiment 6: The audio processor (100) according to one of the embodiments 1 to 5, wherein the cascaded lapped critically sampled transform stage (104) is configured to segment a set (124_1) of bins obtained on the basis of the first block (108_1) of samples using at least two window functions, and to obtain at least two segmented sets (128_1,1;128_1,2) of subband samples based on the segmented set of bins corresponding to the first block (108_1) of samples; wherein the cascaded lapped critically sampled transform stage (104) is configured to segment a set (124_2) of bins obtained on the basis of the second block (108_2) of samples using the at least two window functions, and to obtain at least two sets (128_2,1;128_2,2) of subband samples based on the segmented set of bins corresponding to the second block (108_2) of samples; and wherein filter slopes of the window functions corresponding to adjacent sets of subband samples are symmetric.

Embodiment 7: The audio processor (100) according to one of the embodiments 1 to 6, wherein the cascaded lapped critically sampled transform stage (104) is configured to segment the samples of the audio signal into the first block (108_1) of samples and the second block (108_2) of samples using a first window function; wherein the lapped critically sampled transform stage (104) is configured to segment a set (124_1) of bins obtained on the basis of the first block (108_1) of samples and a set (124_2) of bins obtained on the basis of the second block (108_2) of samples using a second window function, to obtain the corresponding subband samples; and wherein the first window function and the second window function comprise different window width.

Embodiment 8: The audio processor (100) according to one of the embodiments 1 to 6, wherein the cascaded lapped critically sampled transform stage (104) is configured to segment the samples of the audio signal into the first block (108_1) of samples and the second block (108_2) of samples using a first window function; wherein the cascaded lapped critically sampled transform stage (104) is configured to segment a set (124_1) of bins obtained on the basis of the first block (108_1) of samples and a set (124_2) of bins obtained on the basis of the second block (108_2) of samples using a second window function, to obtain the corresponding subband samples; and wherein a window width of the first window function and a window width of the second window function are different from each other, wherein the window width of the first window function and the window width of the second window function differ from each other by a factor different from a power of two.

Embodiment 9: The audio processor (100) according to one of the embodiments 1 to 8, wherein the time domain aliasing reduction stage (106) is configured to perform the weighted combination of two corresponding sets of subband samples according to the following equation $$\begin{bmatrix} y_{v,i}(m) \\ y_{v,i-1}(N-1-m) \end{bmatrix} = A \begin{bmatrix} \hat{y}_{v,i}(m) \\ \hat{y}_{v,i-1}(N-1-m) \end{bmatrix}$$

for 0≤m<N/2 with $$A = \begin{bmatrix} a_v(m) & b_v(m) \\ c_v(m) & d_v(m) \end{bmatrix}$$

to obtain the aliasing reduced subband representation of the audio signal, wherein $y_{v,i}(m)$ is a first aliasing reduced subband representation of the audio signal, $y_{v,i-1}(N-1-m)$ is a second aliasing reduced subband representation of the audio signal. $\hat{y}_{v,i}(m)$ is a set of subband samples on the basis of the second block of samples of the audio signal, $\hat{y}_{v,i-1}(N-1-m)$ is a set of subband samples on the basis of the first block of samples of the audio signal, $a_v(m)$ is . . . , $b_v(m)$ is . . . , $c_v(m)$ is . . . and $d_v(m)$ is . . . .

Embodiment 10: An audio processor (200) for processing a subband representation of an audio signal to obtain the audio signal (102), the audio processor (200) comprising: an inverse time domain aliasing reduction stage (202) configured to perform a weighted combination of two corresponding aliasing reduced subband representations of the audio signal (102), to obtain an aliased subband representation, wherein the aliased subband representation is a set (110_1,1) of subband samples; and a cascaded inverse lapped critically sampled transform stage (204) configured to perform a cascaded inverse lapped critically sampled transform on the set (110_1,1) of subband samples, to obtain a set (206_1,1) of samples associated with a block of samples of the audio signal (102).

Embodiment 11: The audio processor (200) according to embodiment 10, wherein the cascaded inverse lapped critically sampled transform stage (204) comprises a first inverse lapped critically sampled transform stage (208) configured to perform an inverse lapped critically sampled transform on the set (110_1,1) of subband samples, to obtain a set of bins (128_1,1) associated with a given subband of the audio signal; and a first overlap and add stage (210) configured to perform a concatenation of sets of bins associated with a plurality of subbands of the audio signal, which comprises a weighted combination of the set (128_1,1) of bins associated with the given subband of the audio signal (102) with a set (128_1,2) of bins associated with another subband of the audio signal (102), to obtain a set (124_1) of bins associated with a block of samples of the audio signal (102).

Embodiment 12: The audio processor (200) according to embodiment 11, wherein the cascaded inverse lapped critically sampled transform stage (204) comprises a second inverse lapped critically sampled transform stage (212) configured to perform an inverse lapped critically sampled transform on the set (124_1) of bins associated with the block of samples of the audio signal (102), to obtain a set of samples associated with the block of samples of the audio signal (102).

Embodiment 13: The audio processor (200) according to embodiment 12, wherein the cascaded inverse lapped critically sampled transform stage (204) comprises a second overlap and add stage (214) configured to overlap and add the set (206_1,1) of samples associated with the block of samples of the audio signal (102) and another set (206_2,1) of samples associated with another block of samples of the audio signal (102), the block of samples and the another block of samples of the audio signal (102) partially overlapping, to obtain the audio signal (102).

Embodiment 14: The audio processor (200) according to one of the embodiments 10 to 13, wherein the inverse time domain aliasing reduction stage (202) is configured to perform the weighted combination of the two corresponding aliasing reduced subband representations of the audio signal (102) based on the following equation $$\begin{bmatrix} \hat{y}_{v,i}(m) \\ \hat{y}_{v,i-1}(N-1-m) \end{bmatrix} = A^{-1} \begin{bmatrix} y_{v,i}(m) \\ y_{v,i-1}(N-1-m) \end{bmatrix}$$

for 0≤m<N/2 with $$A = \begin{bmatrix} a_v(m) & b_v(m) \\ c_v(m) & d_v(m) \end{bmatrix}$$

to obtain the aliased subband representation, wherein $y_{v,i}(m)$ is a first aliasing reduced subband representation of the audio signal, $y_{v,i-1}(N-1-m)$ is a second aliasing reduced subband representation of the audio signal, $\hat{y}_{v,i}(m)$ is a set of subband samples on the basis of the second block of samples of the audio signal, $\hat{y}_{v,i-1}(N-1-m)$ is a set of subband samples on the basis of the first block of samples of the audio signal, $a_v(m)$ is . . . , $b_v(m)$ is . . . , $c_v(m)$ is . . . and $d_v(m)$ is . . . .

Embodiment 15: An audio encoder, comprising: an audio processor (100) according to one of the embodiments 1 to 9: an encoder configured to encode the aliasing reduced subband representation of the audio signal, to obtain an encoded aliasing reduced subband representation of the audio signal; and a bitstream former configured to form a bitstream from the encoded aliasing reduced subband representation of the audio signal.

Embodiment 16: An audio decoder, comprising: a bitstream parser configured to parse the bitstream, to obtain the encoded aliasing reduced subband representation: a decoder configured to decode the encoded aliasing reduced subband representation, to obtain the aliasing reduced subband representation of the audio signal; and an audio processor (200) according to one of the embodiments 10 to 14.

Embodiment 17. An audio analyzer, comprising: an audio processor (100) according to one of the embodiments 1 to 9; and an information extractor, configured to analyze the aliasing reduced subband representation, to provide an information describing the audio signal.

Embodiment 18: A method (300) for processing an audio signal to obtain a subband representation of the audio signal, the method comprising: performing (302) a cascaded lapped critically sampled transform on at least two partially overlapping blocks of samples of the audio signal, to obtain a set of subband samples on the basis of a first block of samples of the audio signal, and to obtain a corresponding set of subband samples on the basis of a second block of samples of the audio signal; and performing (304) a weighted combination of two corresponding sets of subband samples, one obtained on the basis of the first block of samples of the audio signal and one obtained on the basis on the second block of samples of the audio signal, to obtain an aliasing reduced subband representation of the audio signal.

Embodiment 19: A method (400) for processing a subband representation of an audio signal to obtain the audio signal, the method comprising: Performing (402) a weighted combination of two corresponding aliasing reduced subband representations of the audio signal, to obtain an aliased subband representation, wherein the aliased subband representation is a set of subband samples; and performing (404) a cascaded inverse lapped critically sampled transform on the set of subband samples, to obtain a set of samples associated with a block of samples of the audio signal.

Embodiment 20: A computer program for performing a method according to one of the embodiments 18 and 19.

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus. Some or all of the method steps may be executed by (or using) a hardware apparatus, like for example, a microprocessor, a programmable computer or an electronic circuit. In some embodiments, one or more of the most important method steps may be executed by such an apparatus.

Depending on certain implementation requirements, embodiments of the invention can be implemented in hardware or in software. The implementation can be performed using a digital storage medium, for example a floppy disk, a DVD, a Blu-Ray, a CD, a ROM, a PROM, an EPROM, an EEPROM or a FLASH memory, having electronically readable control signals stored thereon, which cooperate (or are capable of cooperating) with a programmable computer system such that the respective method is performed. Therefore, the digital storage medium may be computer readable.

Some embodiments according to the invention comprise a data carrier having electronically readable control signals, which are capable of cooperating with a programmable computer system, such that one of the methods described herein is performed.

Generally, embodiments of the present invention can be implemented as a computer program product with a program code, the program code being operative for performing one of the methods when the computer program product runs on a computer. The program code may for example be stored on a machine readable carrier.

Other embodiments comprise the computer program for performing one of the methods described herein, stored on a machine readable carrier.

In other words, an embodiment of the inventive method is, therefore, a computer program having a program code for performing one of the methods described herein, when the computer program runs on a computer.

A further embodiment of the inventive methods is, therefore, a data carrier (or a digital storage medium, or a computer-readable medium) comprising, recorded thereon, the computer program for performing one of the methods described herein. The data carrier, the digital storage medium or the recorded medium are typically tangible and/or non-transitionary.

A further embodiment of the inventive method is, therefore, a data stream or a sequence of signals representing the computer program for performing one of the methods described herein. The data stream or the sequence of signals may for example be configured to be transferred via a data communication connection, for example via the Internet.

A further embodiment comprises a processing means, for example a computer, or a programmable logic device, configured to or adapted to perform one of the methods described herein.

A further embodiment comprises a computer having installed thereon the computer program for performing one of the methods described herein.

A further embodiment according to the invention comprises an apparatus or a system configured to transfer (for example, electronically or optically) a computer program for performing one of the methods described herein to a receiver. The receiver may, for example, be a computer, a mobile device, a memory device or the like. The apparatus or system may, for example, comprise a file server for transferring the computer program to the receiver.

In some embodiments, a programmable logic device (for example a field programmable gate array) may be used to perform some or all of the functionalities of the methods described herein. In some embodiments, a field programmable gate array may cooperate with a microprocessor in order to perform one of the methods described herein. Generally, the methods may be performed by any hardware apparatus.

The apparatus described herein may be implemented using a hardware apparatus, or using a computer, or using a combination of a hardware apparatus and a computer.

The apparatus described herein, or any components of the apparatus described herein, may be implemented at least partially in hardware and/or in software.

The methods described herein may be performed using a hardware apparatus, or using a computer, or using a combination of a hardware apparatus and a computer.

The methods described herein, or any components of the apparatus described herein, may be performed at least partially by hardware and/or by software.

While this invention has been described in terms of several embodiments, there are alterations, permutations, and equivalents which will be apparent to others skilled in the art and which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

REFERENCES

[1] Nils Werner and Bernd Edler, "Nonuniform orthogonal filterbanks based on MDCT analysis/synthesis and time-domain aliasing reduction," IEEE Signal Processing Letters, vol. 24, no. 5, pp. 589-593, May 2017.

[2] Fernando C. Pereira and Touradj Ebrahimi, The MPEG-4 Book, Prentice Hall PTR, Upper Saddle River, N.J. USA, 2002,

[3] B. C. Moore and B. R. Glasberg, "Suggested formulae for calculating auditory-filter bandwidths and excitation patterns," J. Acoust. Soc. Am., vol. 74, no. 3, pp. 750-753, September 1983.

[4] A. Taghipour, M. C. Jaikumar, and B. Edler, "A psychoacoustic model with partial spectral flatness measure for tonality estimation," in Proc. 22nd Eur. Signal Process. Conf. (EUSIPCO), 2014, pp. 648-650.

[5] J. D. Johnston, "Estimation of perceptual entropy using noise masking criteria," in ICASSP-88, International Conference on Acoustics. Speech, and Signal Processing, April 1988, pp. 2524-2527 vol. 5.

[6] B. Edler, "Codierung von Audiosignalen mit überlappender Transformation und adaptiven Fensterfunktionen," Frequenz, vol. 43, pp. 252-256, September 1989.

[7] V. Melkote and K. Rose, "Trellis-based approaches to rate-distortion optimized audio encoding," IEEE Transactions on Audio, Speech, and Language Processing, vol. 18, no. 2, pp. 330-341, February 2010.

[8] Mukund Narasimhan, Paul Viola, and Michael Shilman, "Online decoding of markov models under latency constraints," in Proceedings of the 23rd International Conference on Machine Learning, New York, N.Y., USA, 2006, ICML '06, pp. 657-664, ACM.

[9] ITU Radiocommunication Bureau, "BS. 1116-3: methods for the subjective assessment of small impairments in audio systems," Recommendation ITU-R BS. 1116, 2015.

[10] ITU Radiocommunication Bureau, "BS.1534-3: method for the subjective assessment of intermediate quality level of coding systems," Recommendation ITUR BS. 1534, 2015.

[11] ITU Radiocommunication Bureau, "BS.1770-3: algorithms to measure audio programme loudness and true-peak audio level," Recommendation ITU-R BS. 1770, 2015.

[12] F. Schuh, S. Dick, R. Füg, C. R. Helmrich, N. Rettelbach, and T. Schwegler, \Efficient Multichannel Audio Transform Coding with Low Delay and Complexity." Audio Engineering Society, September 2016. [Online]. Available: http://www.aes.org/e-lib/browse.cfm?elib=18464

[13] WO 2018 019 909 A1

[14] EP 3 276 620 A1

The invention claimed is:

1. An audio processor for processing an audio signal to acquire a subband representation of the audio signal, the audio processor comprising:
- a cascaded lapped critically sampled transform stage configured to perform a cascaded lapped critically sampled transform on at least two partially overlapping blocks of samples of the audio signal, to acquire a set of subband samples on the basis of a first block of samples of the audio signal, and to acquire a corresponding set of subband samples on the basis of a second block of samples of the audio signal; and
- a time domain aliasing reduction stage configured to perform a weighted combination of two corresponding sets of subband samples, one acquired on the basis of the first block of samples of the audio signal and one acquired on the basis on the second block of samples of the audio signal, to acquire an aliasing reduced subband representation of the audio signal;

wherein the cascaded lapped critically sampled transform stage is configured to segment a set of bins acquired on the basis of the first block of samples using at least two window functions, and to acquire at least two sets of bins based on the segmented set of bins corresponding to the first block of samples;

wherein the cascaded lapped critically sampled transform stage is configured to segment a set of bins acquired on the basis of the second block of samples using the at least two window functions, and to acquire at least two sets of bins based on the segmented set of bins corresponding to the second block of samples; and wherein the sets of bins are processed using a second lapped critically sampled transform stage of the cascaded lapped critically sampled transform stage, wherein the second lapped critically sampled transform stage is configured to perform lapped critically sampled transforms comprising the same framelength for at least one set of bins;

wherein the audio processor is configured to activate or maintain activated the time domain aliasing reduction stage, if the same framelengths are used for two subsequent blocks, and/or wherein the audio processor is configured to deactivate or maintain deactivated the time domain aliasing reduction stage, if different framelengths are used for two subsequent blocks.

2. The audio processor according to claim 1,
wherein the second lapped critically transform stage is configured to perform $N_{1,1}$ lapped critically sampled transforms on $N_{1,1}$ sub-sets of a first set of the at least two sets of bins acquired on the basis of the segmented set of bins corresponding to the first block of samples, wherein the $N_{1,1}$ lapped critically sampled transforms comprise the same framelength, wherein $N_{1,1}$ is a natural number greater than or equal to two,
wherein the second lapped critically transform stage is configured to perform $N_{1,2}$ lapped critically sampled transforms on $N_{1,2}$ sub-sets of a corresponding first set of the at least two sets of bins acquired on the basis of the segmented set of bins corresponding to the second block of samples, wherein the $N_{2,1}$ lapped critically sampled transforms comprise the same framelength, wherein $N_{2,1}$ is a natural number greater than or equal to two.

3. The audio processor of claim 1,
wherein the audio processor is configured to individually select the framelength for each set of bins or for each of the corresponding sets of bins.

4. The audio processor of claim 1,
wherein the audio processor is configured to individually select the framelength for each block of samples.

5. The audio processor of claim 1,
wherein the processor is configured to perform a common/joint optimization for adapting the framelengths.

6. The audio processor of claim 1,
wherein the at least two window functions comprise the same window width.

7. The audio processor of claim 1,
wherein the at least two window functions comprise different window width.

8. The audio processor of claim 1,
wherein the at least two window functions comprise substantially rectangular windows.

9. The audio processor according to claim 6,
wherein the sets of bins acquired based on the at least two window functions are processed using the second lapped critically sampled transform stage,
wherein the second lapped critically sampled transform stage is configured to perform at least two lapped critically sampled transforms comprising the same framelength for at least one of the sets of bins acquired based on the at least two window functions.

10. The audio processor of claim 1,
wherein the audio processor is configured to perform joint channel coding.

11. The audio processor of claim 10,
wherein the audio processor is configured to perform M/S or multi-channel coding tool, MCT, as joint channel processing.

12. The audio processor of claim 10,
wherein the audio processor is configured to activate or deactivate joint channel processing individually for each of the at least two segmented sets of bins.

13. The audio processor of claim 1,
wherein the audio processor is configured to form a bitstream from an encoded aliasing reduced subband representation of the audio signal,
wherein the audio processor is configured to provide the bitstream comprising at least one mergefactor, MF, parameter signaling at least one framelength of the corresponding sets of bins in the bitstream.

14. The audio processor of claim 13,
wherein the audio processor is configured to entropy encode the at least one mergefactor, MF, parameter.

15. An audio processor for processing an audio signal to acquire a subband representation of the audio signal, the audio processor comprising:
a cascaded lapped critically sampled transform stage configured to perform a cascaded lapped critically sampled transform on at least two partially overlapping blocks of samples of the audio signal, to acquire a set of subband samples on the basis of a first block of samples of the audio signal, and to acquire a corresponding set of subband samples on the basis of a second block of samples of the audio signal; and
a time domain aliasing reduction stage configured to perform a weighted combination of two corresponding sets of subband samples, one acquired on the basis of the first block of samples of the audio signal and one acquired on the basis on the second block of samples of the audio signal, to acquire an aliasing reduced subband representation of the audio signal;
wherein the cascaded lapped critically sampled transform stage is configured to segment a set of bins acquired on the basis of the first block of samples using at least two window functions, and to acquire at least two sets of bins based on the segmented set of bins corresponding to the first block of samples;
wherein the cascaded lapped critically sampled transform stage is configured to segment a set of bins acquired on the basis of the second block of samples using the at least two window functions, and to acquire at least two sets of bins based on the segmented set of bins corresponding to the second block of samples; and
wherein the sets of bins are processed using a second lapped critically sampled transform stage of the cascaded lapped critically sampled transform stage, wherein the second lapped critically sampled transform stage is configured to perform lapped critically sampled transforms comprising the same framelength for at least one set of bins;

wherein the audio processor is configured to form a bitstream from an encoded aliasing reduced subband representation of the audio signal, wherein the audio processor is configured to provide the bitstream comprising at least one mergefactor, MF, parameter signaling at least one framelength of the corresponding sets of bins in the bitstream;

wherein the audio processor is configured to provide the bitstream comprising only a subset of the mergefactor, MF, parameters signaling the framelength of the corresponding sets of bins in the bitstream.

16. An audio processor for processing an audio signal to acquire a subband representation of the audio signal, the audio processor comprising:

a cascaded lapped critically sampled transform stage configured to perform a cascaded lapped critically sampled transform on at least two partially overlapping blocks of samples of the audio signal, to acquire a set of subband samples on the basis of a first block of samples of the audio signal, and to acquire a corresponding set of subband samples on the basis of a second block of samples of the audio signal; and a time domain aliasing reduction stage configured to perform a weighted combination of two corresponding sets of subband samples, one acquired on the basis of the first block of samples of the audio signal and one acquired on the basis on the second block of samples of the audio signal, to acquire an aliasing reduced subband representation of the audio signal;

wherein the cascaded lapped critically sampled transform stage is configured to segment a set of bins acquired on the basis of the first block of samples using at least two window functions, and to acquire at least two sets of bins based on the segmented set of bins corresponding to the first block of samples;

wherein the cascaded lapped critically sampled transform stage is configured to segment a set of bins acquired on the basis of the second block of samples using the at least two window functions, and to acquire at least two sets of bins based on the segmented set of bins corresponding to the second block of samples; and wherein the sets of bins are processed using a second lapped critically sampled transform stage of the cascaded lapped critically sampled transform stage, wherein the second lapped critically sampled transform stage is configured to perform lapped critically sampled transforms comprising the same framelength for at least one set of bins;

wherein the audio processor is configured to form a bitstream from an encoded aliasing reduced subband representation of the audio signal, wherein the audio processor is configured to provide the bitstream comprising at least one mergefactor, MF, parameter signaling at least one framelength of the corresponding sets of bins in the bitstream;

wherein the audio processor is configured to provide the bitstream comprising a time domain aliasing reduction, TDAR, parameter for each corresponding sets of bins.

17. The audio processor of claim 16, wherein the audio processor is configured to perform joint entropy coding of the mergefactor, MF, and time domain aliasing reduction, TDAR, parameters.

18. An audio processor for processing an audio signal to acquire a subband representation of the audio signal, the audio processor comprising:

a cascaded lapped critically sampled transform stage configured to perform a cascaded lapped critically sampled transform on at least two partially overlapping blocks of samples of the audio signal, to acquire a set of subband samples on the basis of a first block of samples of the audio signal, and to acquire a corresponding set of subband samples on the basis of a second block of samples of the audio signal; and a time domain aliasing reduction stage configured to perform a weighted combination of two corresponding sets of subband samples, one acquired on the basis of the first block of samples of the audio signal and one acquired on the basis on the second block of samples of the audio signal, to acquire an aliasing reduced subband representation of the audio signal;

wherein the cascaded lapped critically sampled transform stage is configured to segment a set of bins acquired on the basis of the first block of samples using at least two window functions, and to acquire at least two sets of bins based on the segmented set of bins corresponding to the first block of samples;

wherein the cascaded lapped critically sampled transform stage is configured to segment a set of bins acquired on the basis of the second block of samples using the at least two window functions, and to acquire at least two sets of bins based on the segmented set of bins corresponding to the second block of samples; and wherein the sets of bins are processed using a second lapped critically sampled transform stage of the cascaded lapped critically sampled transform stage, wherein the second lapped critically sampled transform stage is configured to perform lapped critically sampled transforms comprising the same framelength for at least one set of bins;

wherein the audio processor is configured to form a bitstream from an encoded aliasing reduced subband representation of the audio signal, wherein the audio processor is configured to provide the bitstream comprising at least one mergefactor, MF, parameter signaling at least one framelength of the corresponding sets of bins in the bitstream;

wherein the audio processor is configured to provide the bitstream comprising the at least one mergefactor, MF, parameter such that a time domain aliasing reduction, TDAR, parameter is derivable from the at least one mergefactor, MF, parameter.

19. An audio processor for processing an audio signal to acquire a subband representation of the audio signal, the audio processor comprising:

a cascaded lapped critically sampled transform stage configured to perform a cascaded lapped critically sampled transform on at least two partially overlapping blocks of samples of the audio signal, to acquire a set of subband samples on the basis of a first block of samples of the audio signal, and to acquire a corresponding set of subband samples on the basis of a second block of samples of the audio signal; and a time domain aliasing reduction stage configured to perform a weighted combination of two corresponding sets of subband samples, one acquired on the basis of the first block of samples of the audio signal and one acquired on the basis on the second block of samples of the audio signal, to acquire an aliasing reduced subband representation of the audio signal;

wherein the cascaded lapped critically sampled transform stage is configured to segment a set of bins acquired on the basis of the first block of samples using at least two window functions, and to acquire at least two sets of bins based on the segmented set of bins corresponding to the first block of samples;
wherein the cascaded lapped critically sampled transform stage is configured to segment a set of bins acquired on the basis of the second block of samples using the at least two window functions, and to acquire at least two sets of bins based on the segmented set of bins corresponding to the second block of samples; and
wherein the sets of bins are processed using a second lapped critically sampled transform stage of the cascaded lapped critically sampled transform stage, wherein the second lapped critically sampled transform stage is configured to perform lapped critically sampled transforms comprising the same framelength for at least one set of bins;
wherein the audio processor is configured to perform a common/joint optimization for adapting the framelengths using a trellis-grid per set of subband samples.

20. An audio encoder, comprising:
an audio processor according to claim 1;
an encoder configured to encode the aliasing reduced subband representation of the audio signal, to acquire an encoded aliasing reduced subband representation of the audio signal; and
a bitstream former configured to form a bitstream from the encoded aliasing reduced subband representation of the audio signal.

21. A method for processing an audio signal to acquire a subband representation of the audio signal, the method comprising:
performing a cascaded lapped critically sampled transform on at least two partially overlapping blocks of samples of the audio signal, to acquire a set of subband samples on the basis of a first block of samples of the audio signal, and to acquire a corresponding set of subband samples on the basis of a second block of samples of the audio signal; and
performing a weighted combination of two corresponding sets of subband samples, one acquired on the basis of the first block of samples of the audio signal and one acquired on the basis on the second block of samples of the audio signal, to acquire an aliasing reduced subband representation of the audio signal;
wherein performing a cascaded lapped critically sampled transform comprises segmenting a set of bins acquired on the basis of the first block of samples using at least two window functions, and to acquire at least two sets of bins based on the segmented set of bins corresponding to the first block of samples;
wherein performing a cascaded lapped critically sampled transform comprises segmenting a set of bins acquired on the basis of the second block of samples using the at least two window functions, and to acquire at least two sets of bins based on the segmented set of bins corresponding to the second block of samples; and
wherein the sets of bins are processed using a second lapped critically sampled transform of the cascaded lapped critically sampled transform, wherein the second lapped critically sampled transform comprises performing lapped critically sampled transforms comprising the same framelength for at least one set of bins;
wherein the weighted combination of the two corresponding sets of subband samples is performed, if the same framelengths are used for two subsequent blocks, and/or the weighted combination of the two corresponding sets of subband samples is not performed, if different framelengths are used for two subsequent blocks.

22. A method for processing an audio signal to acquire a subband representation of the audio signal, the method comprising:
performing a cascaded lapped critically sampled transform on at least two partially overlapping blocks of samples of the audio signal, to acquire a set of subband samples on the basis of a first block of samples of the audio signal, and to acquire a corresponding set of subband samples on the basis of a second block of samples of the audio signal; and
performing a weighted combination of two corresponding sets of subband samples, one acquired on the basis of the first block of samples of the audio signal and one acquired on the basis on the second block of samples of the audio signal, to acquire an aliasing reduced subband representation of the audio signal;
wherein performing a cascaded lapped critically sampled transform comprises segmenting a set of bins acquired on the basis of the first block of samples using at least two window functions, and to acquire at least two sets of bins based on the segmented set of bins corresponding to the first block of samples;
wherein performing a cascaded lapped critically sampled transform comprises segmenting a set of bins acquired on the basis of the second block of samples using the at least two window functions, and to acquire at least two sets of bins based on the segmented set of bins corresponding to the second block of samples; and
wherein the sets of bins are processed using a second lapped critically sampled transform of the cascaded lapped critically sampled transform, wherein the second lapped critically sampled transform comprises performing lapped critically sampled transforms comprising the same framelength for at least one set of bins;
forming a bitstream from an encoded aliasing reduced subband representation of the audio signal,
providing the bitstream comprising at least one mergefactor, MF, parameter signaling at least one framelength of the corresponding sets of bins in the bitstream;
wherein providing the bitstream comprises providing the bitstream comprising only a subset of the mergefactor, MF, parameters signaling the framelength of the corresponding sets of bins in the bitstream.

23. A method for processing an audio signal to acquire a subband representation of the audio signal, the method comprising:
performing a cascaded lapped critically sampled transform on at least two partially overlapping blocks of samples of the audio signal, to acquire a set of subband samples on the basis of a first block of samples of the audio signal, and to acquire a corresponding set of subband samples on the basis of a second block of samples of the audio signal; and
performing a weighted combination of two corresponding sets of subband samples, one acquired on the basis of the first block of samples of the audio signal and one acquired on the basis on the second block of samples of the audio signal, to acquire an aliasing reduced subband representation of the audio signal;
wherein performing a cascaded lapped critically sampled transform comprises segmenting a set of bins acquired on the basis of the first block of samples using at least two window functions, and to acquire at least two sets of bins based on the segmented set of bins corresponding to the first block of samples;

wherein performing a cascaded lapped critically sampled transform comprises segmenting a set of bins acquired on the basis of the second block of samples using the at least two window functions, and to acquire at least two sets of bins based on the segmented set of bins corresponding to the second block of samples; and wherein the sets of bins are processed using a second lapped critically sampled transform of the cascaded lapped critically sampled transform, wherein the second lapped critically sampled transform comprises performing lapped critically sampled transforms comprising the same framelength for at least one set of bins;

forming a bitstream from an encoded aliasing reduced subband representation of the audio signal, providing the bitstream comprising at least one mergefactor, MF, parameter signaling at least one framelength of the corresponding sets of bins in the bitstream;

wherein providing the bitstream comprises providing the bitstream comprising a time domain aliasing reduction, TDAR, parameter for each corresponding sets of bins.

24. A method for processing an audio signal to acquire a subband representation of the audio signal, the method comprising:

performing a cascaded lapped critically sampled transform on at least two partially overlapping blocks of samples of the audio signal, to acquire a set of subband samples on the basis of a first block of samples of the audio signal, and to acquire a corresponding set of subband samples on the basis of a second block of samples of the audio signal; and performing a weighted combination of two corresponding sets of subband samples, one acquired on the basis of the first block of samples of the audio signal and one acquired on the basis on the second block of samples of the audio signal, to acquire an aliasing reduced subband representation of the audio signal;

wherein performing a cascaded lapped critically sampled transform comprises segmenting a set of bins acquired on the basis of the first block of samples using at least two window functions, and to acquire at least two sets of bins based on the segmented set of bins corresponding to the first block of samples;

wherein performing a cascaded lapped critically sampled transform comprises segmenting a set of bins acquired on the basis of the second block of samples using the at least two window functions, and to acquire at least two sets of bins based on the segmented set of bins corresponding to the second block of samples; and wherein the sets of bins are processed using a second lapped critically sampled transform of the cascaded lapped critically sampled transform, wherein the second lapped critically sampled transform comprises performing lapped critically sampled transforms comprising the same framelength for at least one set of bins;

forming a bitstream from an encoded aliasing reduced subband representation of the audio signal, providing the bitstream comprising at least one mergefactor, MF, parameter signaling at least one framelength of the corresponding sets of bins in the bitstream;

wherein providing the bitstream comprises providing the bitstream comprising the at least one mergefactor, MF, parameter such that a time domain aliasing reduction, TDAR, parameter is derivable from the at least one mergefactor, MF, parameter.

25. A method for processing an audio signal to acquire a subband representation of the audio signal, the method comprising:

performing a cascaded lapped critically sampled transform on at least two partially overlapping blocks of samples of the audio signal, to acquire a set of subband samples on the basis of a first block of samples of the audio signal, and to acquire a corresponding set of subband samples on the basis of a second block of samples of the audio signal; and performing a weighted combination of two corresponding sets of subband samples, one acquired on the basis of the first block of samples of the audio signal and one acquired on the basis on the second block of samples of the audio signal, to acquire an aliasing reduced subband representation of the audio signal;

wherein performing a cascaded lapped critically sampled transform comprises segmenting a set of bins acquired on the basis of the first block of samples using at least two window functions, and to acquire at least two sets of bins based on the segmented set of bins corresponding to the first block of samples;

wherein performing a cascaded lapped critically sampled transform comprises segmenting a set of bins acquired on the basis of the second block of samples using the at least two window functions, and to acquire at least two sets of bins based on the segmented set of bins corresponding to the second block of samples; and wherein the sets of bins are processed using a second lapped critically sampled transform of the cascaded lapped critically sampled transform, wherein the second lapped critically sampled transform comprises performing lapped critically sampled transforms comprising the same framelength for at least one set of bins;

performing a common/joint optimization for adapting the framelengths using a trellis-grid per set of subband samples.

26. A non-transitory digital storage medium having stored thereon a computer program for performing a method for processing an audio signal to acquire a subband representation of the audio signal, the method comprising:

performing a cascaded lapped critically sampled transform on at least two partially overlapping blocks of samples of the audio signal, to acquire a set of subband samples on the basis of a first block of samples of the audio signal, and to acquire a corresponding set of subband samples on the basis of a second block of samples of the audio signal; and performing a weighted combination of two corresponding sets of subband samples, one acquired on the basis of the first block of samples of the audio signal and one acquired on the basis on the second block of samples of the audio signal, to acquire an aliasing reduced subband representation of the audio signal;

wherein performing a cascaded lapped critically sampled transform comprises segmenting a set of bins acquired on the basis of the first block of samples using at least two window functions, and to acquire at least two sets of bins based on the segmented set of bins corresponding to the first block of samples;

wherein performing a cascaded lapped critically sampled transform comprises segmenting a set of bins acquired on the basis of the second block of samples using the at least two window functions, and to acquire at least two sets of bins based on the segmented set of bins corresponding to the second block of samples; and wherein the sets of bins are processed using a second lapped critically sampled transform of the cascaded lapped critically sampled transform, wherein the second lapped critically sampled transform comprises performing lapped critically sampled transforms comprising the same framelength for at least one set of bins;

wherein the weighted combination of the two corresponding sets of subband samples is performed, if the same framelengths are used for two subsequent blocks, and/or the weighted combination of the two corresponding sets of subband samples is not performed, if different framelengths are used for two subsequent blocks when said computer program is run by a computer.

\* \* \* \* \*